US012210347B2

(12) United States Patent
Matsubara et al.

(10) Patent No.: US 12,210,347 B2
(45) Date of Patent: Jan. 28, 2025

(54) VEHICLE CONTROL DEVICE AND VEHICLE CONTROL METHOD

(71) Applicant: TOYOTA JIDOSHA KABUSHIKI KAISHA, Toyota (JP)

(72) Inventors: Toshiyuki Matsubara, Gotenba (JP); Masaki Matsunaga, Odawara (JP); Kenichiro Aoki, Miyoshi (JP); Yoshinori Watanabe, Gotenba (JP); Ryuta Hashimoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 374 days.

(21) Appl. No.: 17/565,143

(22) Filed: Dec. 29, 2021

(65) Prior Publication Data

US 2022/0121209 A1    Apr. 21, 2022

Related U.S. Application Data

(60) Continuation of application No. 16/867,854, filed on May 6, 2020, now Pat. No. 11,835,956, which is a (Continued)

(30) Foreign Application Priority Data

Feb. 29, 2016  (JP) .................. 2016-037875

(51) Int. Cl.
*G05D 1/02*  (2020.01)
*B60W 30/00*  (2006.01)
(Continued)

(52) U.S. Cl.
CPC .......... *G05D 1/0212* (2013.01); *B60W 30/00* (2013.01); *B60W 60/001* (2020.02);
(Continued)

(58) Field of Classification Search
CPC .. G05D 1/0212; B60W 30/00; B60W 60/001; B60W 60/0016; B60W 2420/403;
(Continued)

(56) References Cited

U.S. PATENT DOCUMENTS

| 10,013,876 B2 | 7/2018 | Hillenbrand |
| 10,684,621 B2 | 6/2020 | Matsubara |

(Continued)

FOREIGN PATENT DOCUMENTS

| DE | 10 2007 058 538 A1 | 6/2009 |
| DE | 10 2010 010 856 A1 | 9/2011 |

(Continued)

OTHER PUBLICATIONS

DE 102014215244 (Year: 2024).*

(Continued)

*Primary Examiner* — Jelani A Smith
*Assistant Examiner* — Paul A Castro
(74) *Attorney, Agent, or Firm* — Sughrue Mion, PLLC

(57) ABSTRACT

A vehicle control device includes a scene determination unit determining whether or not a current traveling scene is a traveling-restricted scene, an order setting unit setting priorities corresponding to a restriction with respect to driving behaviors previously classified for different purposes in a case where it is determined that the traveling scene is the traveling-restricted scene and setting priorities with respect to the plurality of driving behaviors in a case where it is not determined that the traveling scene is the traveling-restricted scene, a traveling plan generating unit generating traveling plans corresponding to the plurality of priority-set driving behaviors, an executability determination unit determining executability of each of the plurality of generated driving behaviors, a traveling plan selection unit selecting the traveling plan corresponding to the driving behavior with the
(Continued)

highest priority, and a traveling control unit controlling the traveling of the host vehicle based on the traveling plan.

17 Claims, 17 Drawing Sheets

Related U.S. Application Data division of application No. 15/423,752, filed on Feb. 3, 2017, now Pat. No. 10,684,621.

(51) Int. Cl.
*B60W 60/00* (2020.01)
*G05D 1/00* (2006.01)

(52) U.S. Cl.
CPC ... *B60W 60/0016* (2020.02); *B60W 2420/403* (2013.01); *B60W 2420/408* (2024.01); *B60W 2520/10* (2013.01); *B60W 2520/105* (2013.01); *B60W 2520/125* (2013.01); *B60W 2520/14* (2013.01); *B60W 2552/15* (2020.02); *B60W 2552/30* (2020.02); *B60W 2554/802* (2020.02); *B60W 2554/804* (2020.02); *B60W 2555/20* (2020.02)

(58) Field of Classification Search
CPC ....... B60W 2420/408; B60W 2520/10; B60W 2520/105; B60W 2520/125; B60W 2520/14; B60W 2552/15; B60W 2552/30; B60W 2554/802; B60W 2554/804; B60W 2555/20; B60W 2554/80; B60W 2556/50; B60W 10/04; B60W 10/18; B60W 10/20; B60W 30/12; B60W 30/18163; B60W 30/095

See application file for complete search history.

(56) References Cited

U.S. PATENT DOCUMENTS

| | | |
|---|---|---|
| 2004/0158377 A1 | 8/2004 | Matsumoto et al. |
| 2005/0270374 A1 | 12/2005 | Nishida et al. |
| 2009/0012703 A1 | 1/2009 | Aso et al. |
| 2009/0319113 A1 | 12/2009 | Lee |
| 2016/0075332 A1* | 3/2016 | Edo-Ros ........... B60W 30/0953 701/70 |
| 2017/0137025 A1 | 5/2017 | Muto et al. |
| 2017/0248959 A1 | 8/2017 | Matsubara |
| 2018/0332524 A1 | 11/2018 | Rasanen et al. |
| 2020/0301431 A1 | 9/2020 | Matsubara |

FOREIGN PATENT DOCUMENTS

| | | | |
|---|---|---|---|
| DE | 10 2014 215 244 A1 | 2/2016 | |
| DE | 102014215244 A * | 2/2016 | ............ B60W 30/06 |
| WO | 2007/102405 A1 | 9/2007 | |

OTHER PUBLICATIONS

Office Action dated Jun. 22, 2023 issued by the United States Patent and Trademark Office in U.S. Appl. No. 16/867,854.
United States Office Action issued Mar. 19, 2024 in U.S. Appl. No. 18/090,220.
Notice of Allowance issued Sep. 27, 2024 in U.S. Appl. No. 18/090,220.

* cited by examiner

Fig.5A

| | "LANE KEEPING" PRIORITY | "LANE CHANGE" PRIORITY | "EVACUATION" PRIORITY | "EMERGENCY STOP" PRIORITY |
|---|---|---|---|---|
| - | FIRST | Unselectable | SECOND | Unselectable |

| STATE OF DISTANCE x[m] TO LANE REDUCTION POSITION | "LANE KEEPING" PRIORITY | "LANE CHANGE" PRIORITY | "EVACUATION" PRIORITY | "EMERGENCY STOP" PRIORITY |
|---|---|---|---|---|
| x[m]>500 | FIRST | Unselectable | SECOND | Unselectable |
| 500≧x[m]>200 | SECOND | FIRST | THIRD | Unselectable |
| 200≧x[m]>50 | THIRD | FIRST | SECOND | Unselectable |
| 50≧x[m]>0 | Unselectable | FIRST | SECOND | THIRD |

T2

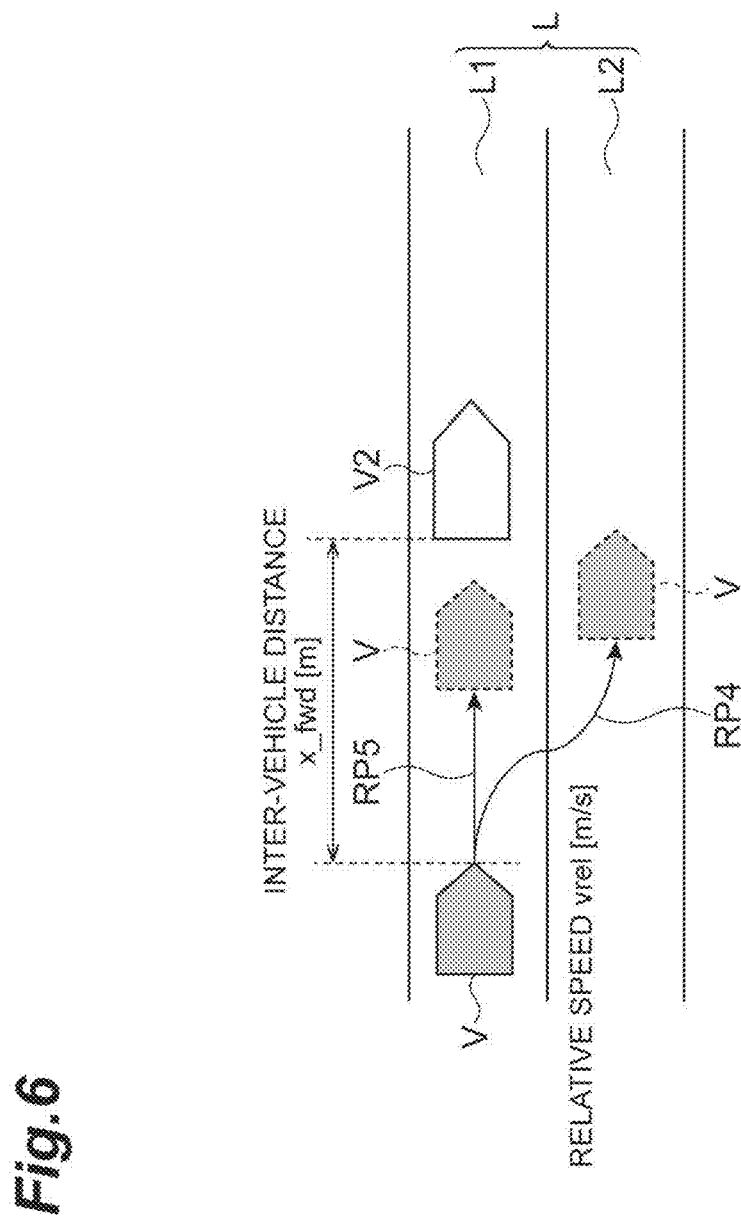

Fig.8A

| | "LANE KEEPING" PRIORITY | "LANE CHANGE" PRIORITY | "EVACUATION" PRIORITY | "EMERGENCY STOP" PRIORITY |
|---|---|---|---|---|
| - | FIRST | Unselectable | SECOND | Unselectable |

| STATES OF INTER-VEHICLE DISTANCE x_fwd [m] AND RELATIVE SPEED vrel [m/s] | "LANE KEEPING" PRIORITY | "LANE CHANGE" PRIORITY | "EVACUATION" PRIORITY | "EMERGENCY STOP" PRIORITY |
|---|---|---|---|---|
| 20[s] ≧ x_fwd/vrel > 0[s] | SECOND | FIRST | THIRD | Unselectable |
| otherwise | FIRST | Unselectable | SECOND | Unselectable |

T4

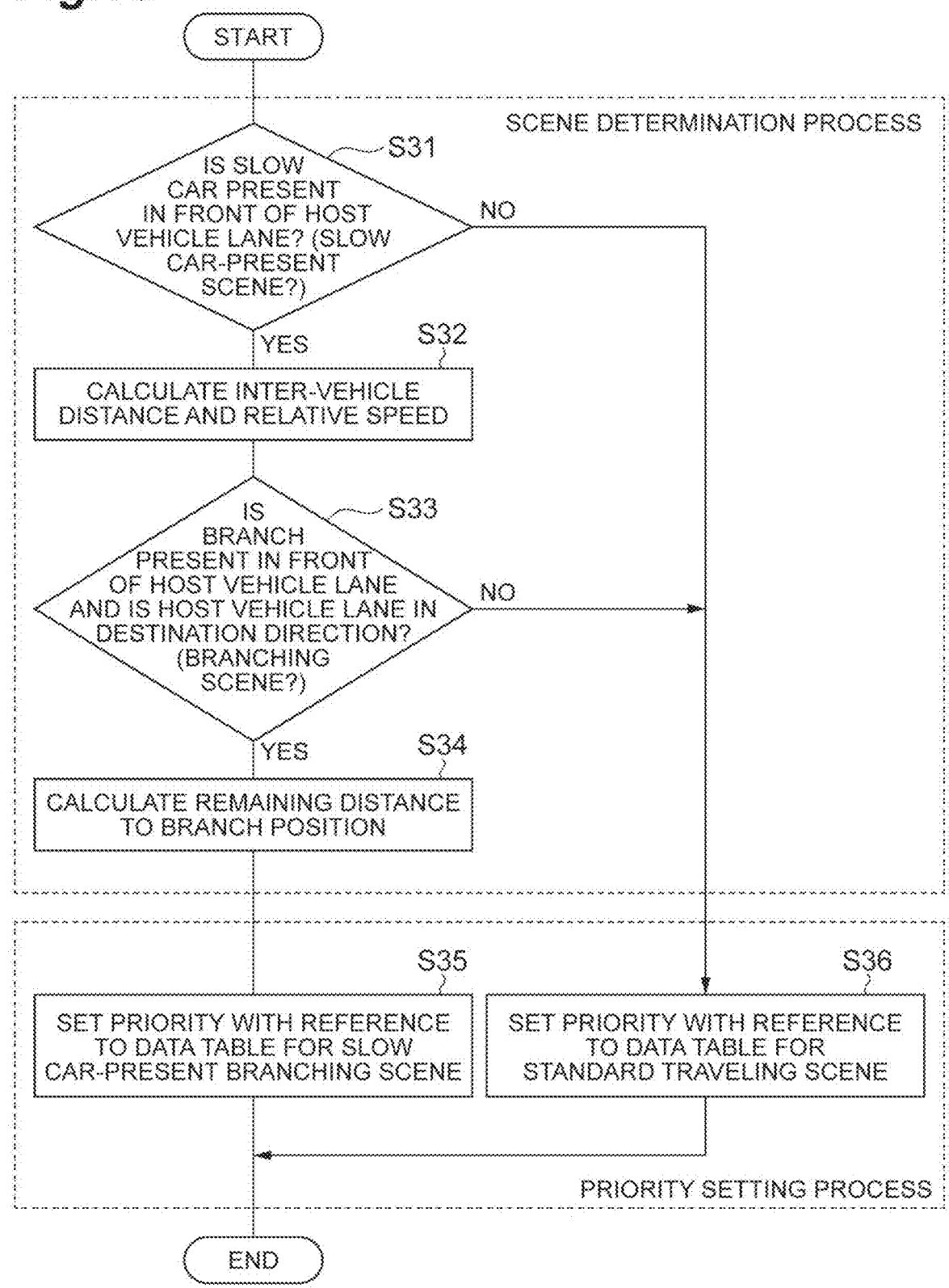

Fig. 11A

| | "LANE KEEPING" PRIORITY | "LANE CHANGE" PRIORITY | "EVACUATION" PRIORITY |
|---|---|---|---|
| - | FIRST | Unselectable | SECOND |

| STATES OF INTER-VEHICLE DISTANCE x_fwd [m] AND RELATIVE SPEED vrel [m/s] | STATE OF REMAINING DISTANCE x_way [m] TO BRANCH | "LANE KEEPING" PRIORITY | "LANE CHANGE" PRIORITY | "EVACUATION" PRIORITY |
|---|---|---|---|---|
| 20[s] ≥ x_fwd/vrel>0[s] | 600[m] ≥ x_way>0[m] | FIRST | Unselectable | SECOND |
| | otherwise | FIRST | SECOND | THIRD |
| otherwise | 600[m] ≥ x_way>0[m] | FIRST | Unselectable | SECOND |
| | otherwise | FIRST | Unselectable | SECOND |

T6

VEHICLE CONTROL DEVICE AND VEHICLE CONTROL METHOD

CROSS REFERENCE TO RELATED APPLICATIONS

This application is a continuation application of U.S. application Ser. No. 16/867,854 filed May 6, 2020, which is a continuation application of U.S. application Ser. No. 15/423,752 filed Feb. 3, 2017 (now U.S. Pat. No. 10,684,621 issued Jun. 16, 2020), which claims priority to Japanese Patent Application No. 2016-037875 filed on Feb. 29, 2016. The entire disclosures of the prior applications are considered part of the disclosure of the accompanying continuation application, and are hereby incorporated by reference.

TECHNICAL FIELD

The present invention relates to a vehicle control device and a vehicle control method.

BACKGROUND

A device that is disclosed in U.S. Unexamined Patent Publication No. 2009/0319113 is known as a technique relating to a vehicle control device according to the related art. In the device that is disclosed in U.S. Unexamined Patent Publication No. 2009/0319113, a desired course of a host vehicle is generated by a course generating unit and a course of the host vehicle is predicted by a course prediction unit. An error between the desired course and the predicted course is obtained, and a steering system of the host vehicle is controlled based on the error.

SUMMARY

Usually, a driving behavior of the host vehicle (such as lane change, lane keeping, and evacuation) is determined and a traveling plan (course) corresponding to the determined driving behavior is generated in the vehicle control device described above. In some cases, the presence of a parallel-traveling car or the like results in the inexecutability of the driving behavior in the generated traveling plan. In this case, a traveling plan corresponding to a driving behavior other than that driving behavior needs to be generated anew. As a result, a host vehicle traveling control reaction might be delayed.

The present invention is to provide a vehicle control device and a vehicle control method with which the possibility of a delayed host vehicle traveling control reaction can be suppressed.

A vehicle control device according to the present invention includes a scene determination unit configured to determine whether or not a current traveling scene of a host vehicle is a traveling-restricted scene based on a situation surrounding the host vehicle, the traveling-restricted scene being a scene where traveling of the host vehicle is restricted, an order setting unit configured to set priorities corresponding to the restriction with respect to a plurality of driving behaviors previously classified for different purposes in a case where it is determined by the scene determination unit that the traveling scene is the traveling-restricted scene and configured to set priorities determined in advance with respect to the plurality of driving behaviors in a case where it is not determined by the scene determination unit that the traveling scene is the traveling-restricted scene, a traveling plan generating unit configured to generate a plurality of traveling plans respectively corresponding to the plurality of driving behaviors based on the surrounding situation, the plurality of driving behaviors having the priorities set by the order setting unit, an executability determination unit configured to determine executability of each of the plurality of driving behaviors generated by the traveling plan generating unit based on the surrounding situation, a traveling plan selection unit configured to select the traveling plan corresponding to the driving behavior with a highest priority set by the order setting unit among the driving behaviors determined to be executable by the executability determination unit from the plurality of traveling plans generated by the traveling plan generating unit, and a traveling control unit configured to control the traveling of the host vehicle based on the traveling plan selected by the traveling plan selection unit.

A vehicle control method according to the present invention includes determining whether or not a current traveling scene of a host vehicle is a traveling-restricted scene based on a situation surrounding the host vehicle, the traveling-restricted scene being a scene where traveling of the host vehicle is restricted, setting priorities corresponding to the restriction with respect to a plurality of driving behaviors previously classified for different purposes in a case where it is determined in the step of determining that the traveling scene is the traveling-restricted scene and setting priorities determined in advance with respect to the plurality of driving behaviors in a case where it is not determined in the step of determining that the traveling scene is the traveling-restricted scene, generating a plurality of traveling plans respectively corresponding to the plurality of driving behaviors based on the surrounding situation, the plurality of driving behaviors having the priorities set in the step of setting, determining executability of each of the plurality of driving behaviors generated in the step of generating based on the surrounding situation, selecting the traveling plan corresponding to the driving behavior with a highest priority set in the step of setting among the driving behaviors determined to be executable in the step of determining executability from the plurality of traveling plans generated in the step of generating, and controlling the traveling of the host vehicle based on the traveling plan selected in the step of selecting.

In the vehicle control device and the vehicle control method according to the present invention, the priorities are set for the plurality of driving behaviors in view of a result of the traveling-restricted scene determination. The plurality of traveling plans respectively corresponding to the plurality of driving behaviors are generated. The executability of each of the plurality of driving behaviors is determined. The traveling plan corresponding to the driving behavior with the highest priority among the executable driving behaviors is selected from the plurality of traveling plans. Then, the traveling of the host vehicle is controlled based on the selected traveling plan. In this manner, the necessity for generating new traveling plan that is attributable to the inexecutability of the driving behavior in the generated traveling plan can be reduced. Accordingly, the possibility of a delayed reaction of the traveling control for the host vehicle can be suppressed.

The vehicle control device according to the present invention may further include a driving behavior execution plan generating unit configured to generate a driving behavior execution plan, which is a transition of the driving behavior at a time of the traveling along a target route from a current location to a destination, based on the surrounding situation, a position of the host vehicle, and map information, and the order setting unit may give the highest priority to the current driving behavior in the driving behavior execution plan. In this case, the likelihood of arrival at the destination can be improved.

In the vehicle control device according to the present invention, the traveling plan generating unit may cause a state where a calculation resource used in the generation of the traveling plan is smaller during the generation of the traveling plan corresponding to the driving behavior set to be low in priority by the order setting unit than during the generation of the traveling plan corresponding to the driving behavior set to be high in priority by the order setting unit. The amount of the calculation that is required for the traveling plan generation can be reduced by this state where the calculation resource used for the traveling plan generation is small being achieved as described above. In addition, the traveling plan corresponding to the driving behavior for which the high priority is set can be generated through further detailed calculation in comparison to the traveling plan corresponding to the driving behavior for which the low priority is set.

According to the present invention, a vehicle control device and a vehicle control method with which the possibility of a delayed host vehicle traveling control reaction can be suppressed can be provided.

BRIEF DESCRIPTION OF THE DRAWINGS

FIG. 5A is a diagram illustrating a data table for a standard traveling scene that is used in the priority setting process illustrated in FIG. 4. FIG. 5B is a diagram illustrating a data table for the lane-reduced scene that is used in the priority setting process illustrated in FIG. 4.

FIG. 6 is a schematic diagram illustrating the vicinity of the host vehicle in a slow car-present scene.

FIG. 8A is a diagram illustrating a data table for the standard traveling scene that is used in the priority setting process illustrated in FIG. 7. FIG. 8B is a diagram illustrating a data table for the slow car-present scene that is used in the priority setting process illustrated in FIG. 7.

FIG. 10 is a flowchart illustrating the scene determination process and the priority setting process targeting the slow car-present scene and the branching scene.

FIG. 11A is a diagram illustrating a data table for the standard traveling scene that is used in the priority setting process illustrated in FIG. 10. FIG. 11B is a diagram illustrating a data table for a slow car-present branching scene that is used in the priority setting process illustrated in FIG. 10.

DETAILED DESCRIPTION

Figure 1:
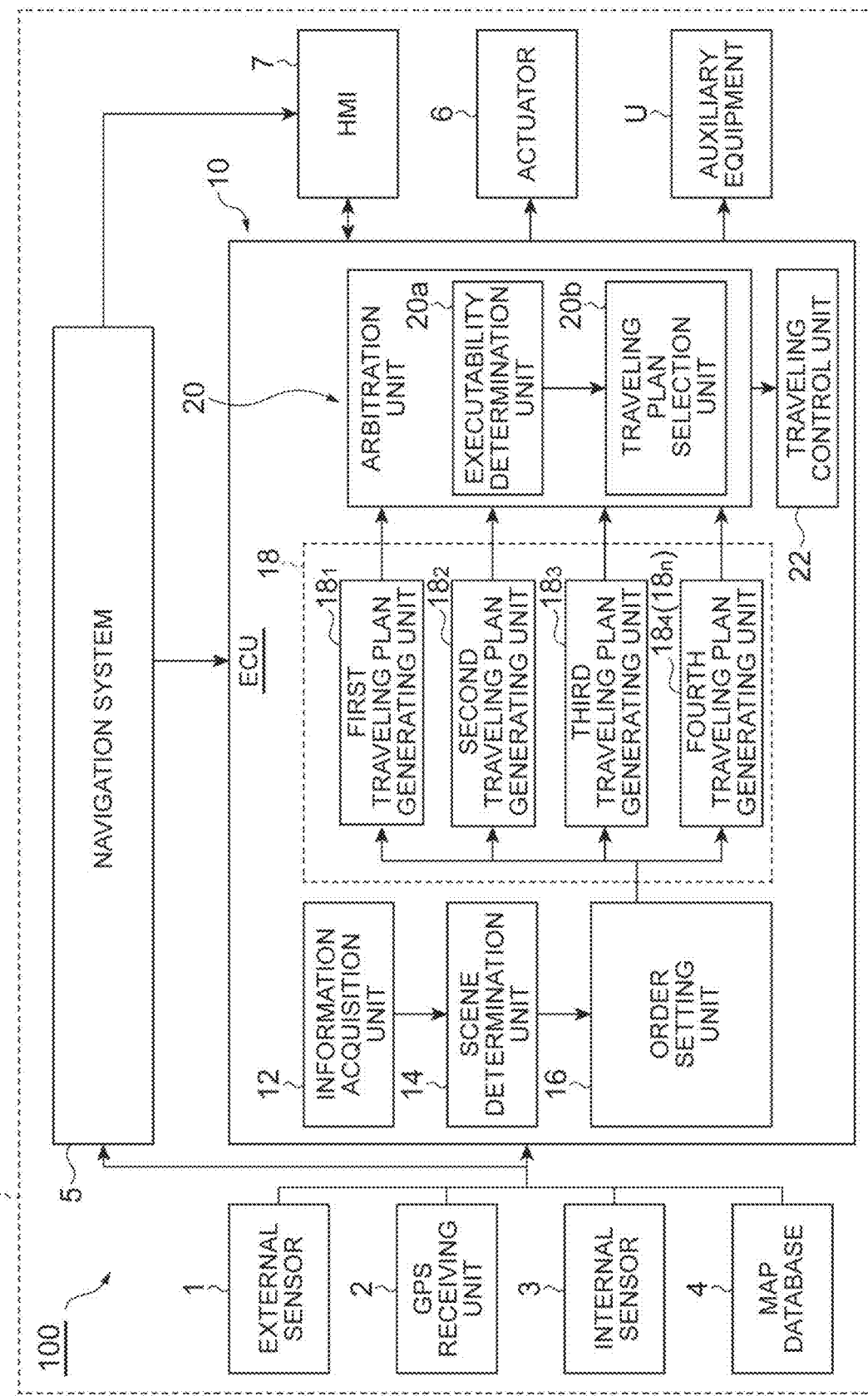
FIG. 1 is a block diagram illustrating a configuration of a vehicle control device according to a first embodiment.

Hereinafter, embodiments of the present invention will be described in detail with reference to accompanying drawings. In the following description, the same reference numerals will be used to refer to the same or corresponding elements, and description thereof will be omitted.

First Embodiment

FIG. 1 is a block diagram illustrating a configuration of a vehicle control device 100 according to a first embodiment. As illustrated in FIG. 1, the vehicle control device 100 is mounted in a host vehicle V such as an automobile. The vehicle control device 100 is provided with an external sensor 1, a global positioning system [GPS] receiving unit 2, an internal sensor 3, a map database 4, a navigation system 5, an actuator 6, auxiliary equipment U, an electronic control unit [ECU] 10, and a human machine interface [HMI] 7.

The external sensor 1 is detection equipment detecting an external situation regarding the host vehicle V. The external sensor 1 includes at least one of a camera, a radar, and a laser imaging detection and ranging [LIDAR]. The external sensor 1 transmits information related to the detected external situation to the ECU 10.

The camera is imaging equipment imaging the external situation regarding the host vehicle V. The camera may be a monocular camera or may be a stereo camera. The stereo camera has two imaging units that are placed to reproduce a binocular disparity. The radar detects the external situation around the host vehicle V by using radio waves (such as millimeter waves). The LIDAR detects the external situation around the host vehicle V by using light. The camera, the LIDAR, and the radar do not necessarily have to be provided in an overlapping manner.

The GPS receiving unit 2 measures a position of the host vehicle V (a latitude and a longitude of the host vehicle V) by receiving signals from at least three GPS satellites. The GPS receiving unit 2 transmits, to the ECU 10, positional information related to the measured position of the host vehicle V. Any other means by which the latitude and the longitude of the host vehicle V can be pinpointed may take the place of the GPS receiving unit 2. For checking by comparison between a sensor measurement result and map information (described later), it is preferable that a function for measuring an orientation of the host vehicle V is provided.

The internal sensor 3 detects a traveling state of the host vehicle V. The internal sensor 3 includes at least one of a vehicle speed sensor, an acceleration sensor, and a yaw rate sensor. The vehicle speed sensor is a detector that detects a speed of the host vehicle V. A vehicle wheel speed sensor that detects a rotation speed of a vehicle wheel is used as the vehicle speed sensor. The acceleration sensor is a detector that detects an acceleration of the host vehicle V. The acceleration sensor includes a longitudinal acceleration sensor detecting the acceleration of the host vehicle V in a longitudinal direction and a lateral acceleration sensor detecting a lateral acceleration of the host vehicle V. The yaw rate sensor is a detector that detects a yaw rate (rotation angular velocity) about a vertical axis of the center of gravity of the host vehicle V. A gyro sensor can be used as the yaw rate sensor.

The internal sensor 3 detects a driving operation by a driver of the host vehicle V or the vehicle control device 100. The internal sensor 3 includes at least one of a steering sensor, an acceleration sensor, a brake sensor, a winker sensor, and a hazard detection sensor. The steering sensor detects a steering operation by the driver or the vehicle control device 100. The acceleration sensor detects an accelerator operation by the driver or the vehicle control device 100. The brake sensor detects a brake operation by the driver or the vehicle control device 100. The winker sensor detects a winker (turn signal lamp) operation by the driver or the vehicle control device 100. The hazard sensor detects a hazard lamp operation by the driver or the vehicle control device 100. Each of the steering sensor, the acceleration sensor, the brake sensor, the winker sensor, and the hazard detection sensor is not particularly limited, and various known sensors can be used as the steering sensor, the acceleration sensor, the brake sensor, the winker sensor, and the hazard detection sensor. The steering sensor, the acceleration sensor, the brake sensor, the winker sensor, and the hazard detection sensor do not necessarily have to be provided in an overlapping manner. This internal sensor 3 transmits, to the ECU 10, the detected traveling state of the host vehicle V and information related to the driving operation.

The map database 4 is a database that is provided with the map information. The map database is formed within a hard disk drive [HDD] that is mounted in the host vehicle V. The map information includes positional information regarding roads, road shape information (such as curves, linear portion types, and curve curvatures), and positional information regarding intersections and branch points. It is preferable that the map information also includes an output signal of the external sensor 1 for the use of positional information regarding shielding structures such as buildings and walls and simultaneous localization and mapping (SLAM) technology. The map database 4 may be stored in a computer in a facility such as an information processing center capable of communicating with the host vehicle V.

The navigation system 5 is a device that guides the driver of the host vehicle V to a destination set by the driver of the host vehicle V. The navigation system 5 calculates a traveling route of the host vehicle V based on the positional information regarding the host vehicle V measured by the GPS receiving unit 2 and the map information of the map database 4. The route may be a certain appropriate lane in a section having a plurality of the lanes. The navigation system 5 calculates a target route from a current location of the host vehicle V to the destination. The navigation system 5 transmits information regarding the target route of the host vehicle V to the ECU 10. The navigation system 5 may be stored in the computer in the facility such as the information processing center capable of communicating with the host vehicle V.

The actuator 6 is a device that controls traveling of the host vehicle V. The actuator 6 includes at least an engine actuator, a brake actuator, and a steering actuator. The engine actuator controls the amount of air supply to an engine (throttle opening degree) in accordance with a control signal from the ECU 10 and controls a driving force of the host vehicle V. In a case where the host vehicle V is a hybrid car, not only the amount of the air supply to the engine but also the driving force is controlled by a control signal from the ECU 10 being input to a motor as a power source. In a case where the host vehicle V is an electric vehicle, the driving force is controlled by a control signal from the ECU 10 being input to a motor as a power source. The motor as the power source in these cases constitutes the actuator 6.

The brake actuator controls a brake system in accordance with a control signal from the ECU 10 and controls a braking force given to the vehicle wheel of the host vehicle V. A hydraulic brake system can be used as the brake system. The steering actuator controls, in accordance with a control signal from the ECU 10, driving of an assist motor that controls a steering torque in an electric power steering system. In this manner, the steering actuator controls the steering torque of the host vehicle V.

The HMI 7 is an interface for information output and input between a passenger in the host vehicle V (including the driver) and the vehicle control device 100. The HMI 7 is provided with, for example, a display panel for image information display, a speaker for audio output, and an operation button or a touch panel for the passenger's input operations. In the HMI 7, the input operations for various functions (operation or stop of a traveling control such as automatic traveling, destination input operation regarding the navigation system 5) are performed by the passenger. The HMI 7 may perform information output to the passenger by using a wirelessly-connected portable information terminal or may receive the passenger's input operation by using a portable information terminal.

The auxiliary equipment U collectively refer to equipment not included in the actuator 6. The auxiliary equipment U according to this embodiment include, for example, an air conditioning device and a wiper. The auxiliary equipment U may be automatically controlled based on a control signal from the ECU 10 and in accordance with, for example, a temperature around the host vehicle V and weather.

The ECU 10 controls an operation of each portion of the vehicle control device 100 during automatic driving. The ECU 10 is an electronic control unit that has a central processing unit [CPU], a read only memory [ROM], a random access memory [RAM], and the like. The ECU 10 executes various controls by loading a program stored in the ROM on the RAM and executing the program with the CPU. A plurality of the electronic control units may constitute the ECU 10 as well. The ECU 10 has an information acquisition unit 12, a scene determination unit 14, an order setting unit 16, a traveling plan generating unit 18, and an arbitration unit 20.

The information acquisition unit 12 acquires various information based on inputs from the external sensor 1, the GPS receiving unit 2, the internal sensor 3, the map database 4, the navigation system 5, and the HMI 7. The information acquisition unit 12 acquires information related to a situation surrounding the host vehicle V. The surrounding situation has traveling path information and obstacle information.

The traveling path information includes information on a position and a shape of a traveling path in which the host vehicle V can travel. The traveling path information may also include information such as white line types, lane attributes (such as climbing lanes), and speed limits. The traveling path information can be acquired from a signboard or white line recognition result based on the map information of the map database 4 and the input from the external sensor 1. In a case where the host vehicle V is provided with an in-vehicle communication unit that performs road-to-vehicle communication or inter-vehicle communication, the traveling path information may be acquired by the use of in-vehicle communication of the in-vehicle communication unit.

The obstacle information is information related to a position and a speed of an obstacle. The obstacle includes a surrounding moving object and a surrounding stationary object in addition to a surrounding car. The obstacle information may also include a size, a shape, and an attribute of the obstacle (such as a vehicle type and obstacle recognition reliability in a case where the obstacle is a vehicle). The obstacle information can be recognized and acquired based on the input from the external sensor 1. In a case where the host vehicle V is provided with the in-vehicle communication unit, the obstacle information may be acquired by the use of the in-vehicle communication of the in-vehicle communication unit.

The information acquisition unit 12 acquires information related to a host vehicle position, which is the position of the host vehicle V, from a result of reception by the GPS receiving unit 2. The host vehicle position can be a position on a map or a relative position in a lane. The host vehicle position may also be acquired by the use of localization, in-vehicle communication, inertial navigation, and the like. The information acquisition unit 12 acquires the map information from the map database 4.

The information acquisition unit 12 detects information related to a vehicle state of the host vehicle V based on the inputs from the internal sensor 3 and the HMI 7. The vehicle state-related information has information on the traveling state of the host vehicle V and information on the driver's driving operation. The traveling state information includes physical quantities such as a current speed and an acceleration of the host vehicle V. The driving operation information includes the driving operation by the driver and the driver's system request command. This information acquisition unit 12 does not necessarily have to acquire all the information described above. For example, the information acquisition unit 12 may acquire only some of the information described above depending on content of processing by the ECU 10. The information acquisition unit 12 may acquire other information as well.

The scene determination unit 14 executes a scene determination process based on a result of the acquisition by the information acquisition unit 12. The scene determination process is a process for determining whether or not a traveling scene of the host vehicle V is a traveling-restricted scene where the traveling of the host vehicle V is restricted. The traveling-restricted scene is a particular surrounding environment or host vehicle environment that is likely to affect a driving behavior. The traveling-restricted scene includes a traveling scene where the restriction is present based on the shape or the position of the traveling path. Examples of the traveling-restricted scene include the following traveling scenes: traveling scene in the vicinity of an ETC gate; ramp-way traveling scene; branch or junction traveling scene; lane-reduced or lane-increased traveling scene; traveling scene in a high-curvature section; traveling scene in a high-gradient section; traveling scene in a section with a change in curvature cant gradient; traveling scene in a low-visibility section; traveling scene in a tunnel section; traveling scene in the climbing lane; and traveling scene in a section with different, upper and lower, roads.

The restriction is for a traveling plan of the host vehicle V to be satisfied. The restriction includes a restriction on the position of the host vehicle V with respect to the shape of the traveling path and restrictions on the physical quantities such as the speed and the acceleration. Examples of the restriction include the position, speed, and acceleration that should be achieved in a certain period of time from a current time. The examples of the restriction also include an in-lane position, a maximum speed, a maximum acceleration, and a minimum distance margin with respect to the obstacle that should be achieved during a certain period of time starting from the current time.

For example, the scene determination unit 14 determines, based on the traveling path information and the host vehicle position, whether or not the current traveling scene of the host vehicle V is a traveling-restricted scene where the lane is reduced in front of the host vehicle V (hereinafter, referred to as a "lane-reduced scene"). The scene determination unit 14 can detect the lane-reduced scene by detecting lane discontinuity in the front of the lane of the host vehicle. In addition, the scene determination unit 14 determines, based on the traveling path information, the host vehicle position, and the obstacle information, whether or not the current traveling scene of the host vehicle V is a traveling-restricted scene where a slow car with a low vehicle speed is present in front of the host vehicle V (hereinafter, referred to as a "slow car-present scene"). Furthermore, the scene determination unit 14 determines, based on the traveling path information, the host vehicle position, and the obstacle information, whether or not the current traveling scene of the host vehicle V is a traveling-restricted scene where a branch is present in front of the host vehicle V and the lane of the host vehicle is a lane in a target direction (hereinafter, referred to as a "branching scene"). The scene determination unit 14 can have a plurality of the traveling-restricted scenes as determination objects. The scene determination unit 14 can determine the various traveling-restricted scenes from the shapes of, contact relationship between, or lane attributes of the lanes.

In the scene determination process, the scene determination unit 14 calculates the restriction of the traveling-restricted scene based on the acquisition result of the information acquisition unit 12. In a case where, for example, it is determined that the traveling scene is the lane-reduced scene, the scene determination unit 14 calculates a distance x [m] of the host vehicle V to a lane reduction position as the restriction (refer to FIG. 3). In a case where it is determined that the traveling scene is the slow car-present scene, the scene determination unit 14 calculates an inter-vehicle distance x_fwd [m] and a relative speed vrel [m/s] with respect to the slow car as the restriction (refer to FIG. 6). In a case where it is determined that the traveling scene is the branching scene, the scene determination unit 14 calculates a remaining distance x_way [m] to a branch position as the restriction (refer to FIG. 9).

The order setting unit 16 executes a priority setting process for setting a priority with respect to each of a plurality of the driving behaviors. The plurality of driving behaviors are behaviors classified for different purposes and achieved as results of vehicle behaviors. The plurality of driving behaviors are determined in advance and stored in the ECU 10. Examples of the driving behaviors include the following behaviors:

"Lane keeping", "lane change", "evacuation (behavior for standing by after stopping in a shoulder or at a lane end)", "return to a lane during white line straddling", "lane keeping at a vehicle speed lower than a certain vehicle speed", and "lane keeping at a vehicle speed higher than a certain vehicle speed" for reaching a certain position or state; "motion realizing smooth traveling", "motion allowing at least a certain level of acceleration and jerk", "motion with at least a certain level of allowable lateral position range (motion with a reduced minimum margin with respect to the white line)", and "motion putting lane deviation avoidance first" aiming for an ongoing vehicle motion; "obstacle avoidance" and "lane change allowing a short inter-vehicle distance (interruption)" aiming to ensure a safety margin; "joining", "branching", "congestion", "ETC gate passage", "ramp way traveling", "non-regular lane passage (in the case of traveling-allowed area designation with a pylon or the like apart from the white line in a roadwork section or the like)", "overtaking", "lane keeping in accordance with the vehicle speed of the surrounding car", "traveling in accordance with the weather (traveling in the rain or the like)", and "traveling at night" for special traveling corresponding to a certain surrounding environment; and "traveling at the time of a sensor failure", "traveling on the premise of a short sensing distance and a low level of sensing accuracy", "traveling at the time of a decline in motion control performance", and "traveling during driving operation assist" for a certain vehicle state or special traveling in compliance with an instruction from the driver. The examples also include motions achieved by combination of one or more of these. The examples also include motions achieved by a higher level of conceptualization in which one or more of these are included. The examples also include motions achieved by fragmentation of one of these.

The order setting unit 16 sets the priority of each driving behavior in accordance with a result of the scene determination process. Specifically, the order setting unit 16 sets the priorities corresponding to the restriction with respect to the plurality of driving behaviors in a case where it is determined by the scene determination unit 14 that the traveling scene is the traveling-restricted scene. In a case where it is not determined by the scene determination unit 14 that the traveling scene is the traveling-restricted scene, the order setting unit 16 sets priorities determined in advance with respect to the plurality of driving behaviors.

The order setting unit 16 sets the priorities based on a rule determined in advance. The order setting unit 16 sets the priorities by using a data table that is stored in the ECU 10 after being set in advance for each traveling-restricted scene. Specifically, in the case where it is determined by the scene determination unit 14 that the traveling scene is the traveling-restricted scene, the order setting unit 16 sets the priorities from the acquisition result of the information acquisition unit 12 and with respect to the plurality of driving behaviors by referring to a data table showing a relationship between an order varying with a restriction value and the driving behavior (refer to, for example, FIG. 5B). In the case where it is not determined by the scene determination unit 14 that the traveling scene is the traveling-restricted scene, the order setting unit 16 sets the priorities with respect to the plurality of driving behaviors by referring to a data table showing a relationship between a certain order and the driving behavior (refer to, for example, FIG. 5A).

The order setting unit 16 sets the priority of each driving behavior by using the data table. However, methods for the priority setting are not particularly limited thereto. The order setting unit 16 may set the priority based on mathematical formula processing or knowledge database-based determination as well. The order setting unit 16 is connected to the traveling plan generating unit 18 and outputs the priority of each driving behavior to the arbitration unit 20 via the traveling plan generating unit 18. The order setting unit 16 may also output the priority of each driving behavior directly to the arbitration unit 20 by being directly connected to the arbitration unit 20.

The order setting unit 16 may give the order to only some of the driving behaviors. The order setting unit 16 may give the driving behavior, as the priority, an instruction of "no room for selection (unselectable)" or "stop of traveling plan calculation". "No room for selection" is an instruction indicating that no selection can be performed by a traveling plan selection unit 20b (described later). "Stop of traveling plan calculation" is an instruction indicating that traveling plan generation by the traveling plan generating unit 18 is not performed.

The traveling plan generating unit 18 generates a plurality of the traveling plans respectively corresponding to the plurality of driving behaviors, the priorities of which are set by the order setting unit 16, based on the acquisition result of the information acquisition unit 12. The traveling plan generating unit 18 includes, as functional configurations, first to nth traveling plan generating units $18_1$ to $18_n$ that are disposed for the respective classified driving behaviors. The number of the first to nth traveling plan generating units $18_1$ to $18_n$ is equal to the number of the classified driving behaviors, and n corresponds to the number of the classified driving behaviors. The first to nth traveling plan generating units $18_1$ to $18_n$ generate the traveling plans respectively realizing the plurality of classified driving behaviors.

In the example that is illustrated in FIG. 1, the traveling plan generating unit 18 includes a first traveling plan generating unit $18_1$ realizing the driving behavior of lane keeping, a second traveling plan generating unit $18_2$ realizing the driving behavior of lane change, a third traveling plan generating unit $18_3$ realizing the driving behavior of evacuation, and a fourth traveling plan generating unit $18_4$ realizing the driving behavior of emergency stop in response to the driving behavior classified into the four of "lane keeping", "lane change", "evacuation", and "emergency stop (immediate stop following collision avoidance)". The number of the first to nth traveling plan generating units $18_1$ to $18_n$ is not particularly limited and may be two or more (n being at least two).

The traveling plan generating unit 18 generates a course of the host vehicle V based on the target route calculated by the navigation system 5 and the host vehicle position and the surrounding situation acquired by the information acquisition unit 12. The course is a trajectory of the host vehicle V in the target route. The traveling plan generating unit 18 generates the course such that traveling appropriate in the light of criteria such as safety, law abidance, and traveling efficiency is performed on the target route by the host vehicle V.

The target route described above also includes a traveling route that is automatically generated based on one or both of the external situation and the map information when no explicit destination setting is performed by the driver, examples of which include traveling routes along roads according to the "driving support device" disclosed in Japanese Patent Publication No. 5382218 (WO 2011/

158347) and the "automatic driving device" disclosed in Japanese Patent Application Publication No. 2011-162132.

The traveling plan generating unit 18 generates the traveling plan in accordance with the generated course. In other words, the traveling plan generating unit 18 generates the traveling plan according to the target route set in advance based on the surrounding situation and the map information of the map database 4 at the least. Preferably, the traveling plan generating unit 18 outputs the traveling plan that it generates as one having a plurality of sets of the two elements of a target position p and a speed v by target point in a coordinate system fixed to the host vehicle V, that is, a plurality of configuration coordinates (p, v) with regard to the course of the host vehicle V. Herein, each of the target positions p has at least x-coordinate and y-coordinate positions in the coordinate system fixed to the host vehicle V or information equivalent thereto. The traveling plan is not particularly limited insofar as the traveling plan shows a behavior of the host vehicle V. For the traveling plan, a target time t may be used instead of the speed v. Alternatively, one to which the target time t and the orientation of the host vehicle V at that point in time are added may take the place of it.

The traveling plan includes motion profiles such as the position, speed, and acceleration of the host vehicle V that should be traveling control targets until the elapse of a very short period of time from the current time. The motion profile is calculated within a motion limit range and in view of riding comfort while a margin is ensured with respect to the wall or the surrounding car. Usually, future data on approximately several seconds ahead of the current time will suffice as the traveling plan. Depending on situations such as a right turn at the intersection and overtaking by the host vehicle V, however, data for tens of seconds is required. Accordingly, it is preferable that the number of the configuration coordinates of the traveling plan is variable and a distance between the configuration coordinates is also variable. In addition, a curve linking the configuration coordinates may be approximated with a spline function or the like and a parameter of the curve may be regarded as the traveling plan. Any known method can be used for the traveling plan generation insofar as the method can show the behavior of the host vehicle V.

The traveling plan may be data showing transitions of the vehicle speed of the host vehicle V, acceleration and deceleration of the host vehicle V, the steering torque of the host vehicle V, and the like at a time of the traveling of the host vehicle V in the course along the target route. The traveling plan may include a speed pattern of the host vehicle V, acceleration and deceleration patterns of the host vehicle V, and a steering pattern of the host vehicle V. The traveling plan generating unit 18 may generate the traveling plan such that a travel time (the length of time required for the host vehicle V to reach the destination) is minimized.

The speed pattern is data consisting of a target vehicle speed set in association with time for each target control position with respect to the target control positions set on the course at predetermined intervals. The acceleration and deceleration patterns are data consisting of target acceleration and deceleration set in association with time for each target control position with respect to the target control positions set on the course at predetermined intervals. The steering pattern is data consisting of a target steering torque set in association with time for each target control position with respect to the target control positions set on the course at predetermined intervals.

Calculation by the traveling plan generating unit 18 may be executed independently from calculation by the order setting unit 16. The calculation by the traveling plan generating unit 18 may be executed at an earlier update cycle than calculation by the scene determination unit 14 or the order setting unit 16. This allows a reduction in calculation resource while allowing vehicle behavior safety to be ensured and not lowering the driver's discomfort.

The traveling plan generating unit 18 may generate a certain traveling plan by correcting another existing traveling plan by a known method. For example, the traveling plan generating unit 18 may generate a traveling plan corresponding to the lane keeping by correcting a traveling plan corresponding to collision avoidance. The traveling plan generating unit 18 may perform calculation only for required places with parts common to the driving behaviors shared. In this case, the calculation resource can be reduced. The traveling plan generating unit 18 may associate the traveling plan with an operation pattern of the winker, a headlight, or the like and an output pattern of a warning from the HMI 7 or the like.

The arbitration unit 20 selects one final traveling plan to be output to a traveling control unit 22, based on the priority and while determining executability thereof, from the plurality of traveling plans by driving behavior generated by the traveling plan generating unit 18. The arbitration unit 20 has an executability determination unit 20a and the traveling plan selection unit 20b.

The executability determination unit 20a determines the executability of each of the plurality of driving behaviors generated by the traveling plan generating unit 18 based on the acquisition result of the information acquisition unit 12. The executability determination unit 20a determines, with regard to each of the plurality of generated traveling plans, from the surrounding situation, and by a known method, whether or not the traveling plan allows appropriate traveling to be realized (that is, whether or not a solution of an executable traveling plan is obtained). The executability determination unit 20a outputs a result of the determination as executability information to the traveling plan selection unit 20b.

In a case where, for example, a parallel-traveling car is present in an adjacent lane and the traveling plan realizing the lane change to the adjacent lane results in an approach to the parallel-traveling car to the point of a certain distance or less, the executability determination unit 20a determines that the traveling plan is not executable and outputs executability information indicating that the lane change is not executable to the traveling plan selection unit 20b. In a case where no parallel-traveling car is present, the executability determination unit 20a determines that the lane change-realizing traveling plan is executable and outputs executability information indicating that the lane change is executable to the traveling plan selection unit 20b.

The traveling plan selection unit 20b selects, from the plurality of traveling plans generated by the traveling plan generating unit 18, the traveling plan corresponding to the driving behavior that has the highest priority set by the order setting unit 16 among the driving behaviors determined by the executability determination unit 20a to be executable. The traveling plan selection unit 20b distinguishes an executable driving behavior with the executability information from the executability determination unit 20a. The traveling plan selection unit 20b outputs the selected traveling plan to the traveling control unit 22. In a case where no driving behavior is executable at all, the traveling plan selection unit 20b outputs a traveling control termination command to the traveling control unit 22 and the HMI 7.

The traveling control unit 22 automatically controls the traveling of the host vehicle V based on the traveling plan selected by the traveling plan selection unit 20b. The traveling control unit 22 outputs a control signal corresponding to the traveling plan to the actuator 6. In this manner, the traveling control unit 22 controls the traveling of the host vehicle V such that the host vehicle V automatically travels in accordance with the traveling plan.

Figure 2:
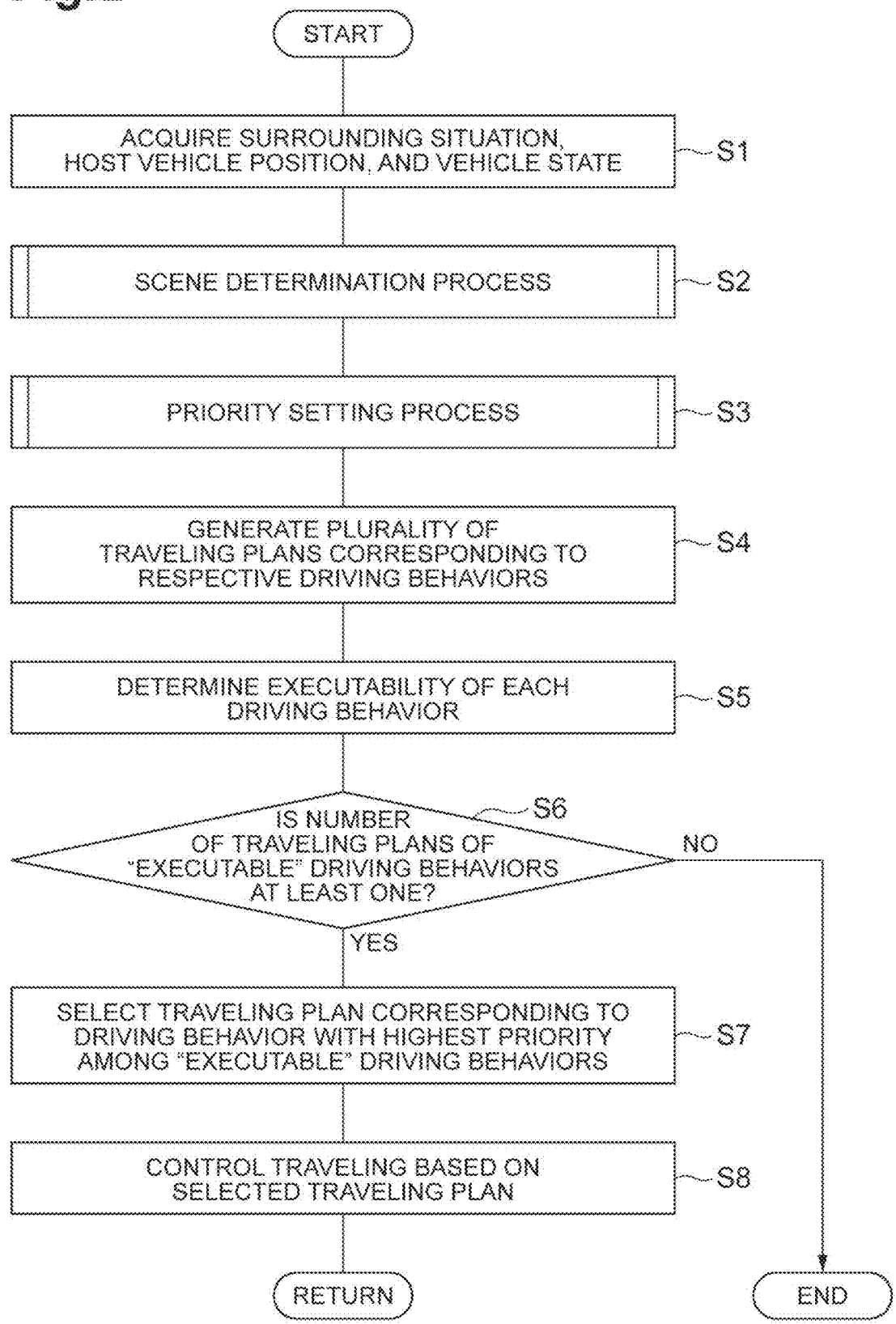
FIG. 2 is a flowchart illustrating a process in the vehicle control device in FIG. 1.

Hereinafter, a process (vehicle control method) executed by the vehicle control device 100 will be described in detail with reference to the flowchart that is illustrated in FIG. 2.

FIG. 2 is a flowchart illustrating the process in the vehicle control device 100. As illustrated in FIG. 2, the ECU 10 of the vehicle control device 100 executes the following process in a case where a predetermined initiation condition is satisfied, examples of which include an input operation for putting the automatic traveling into operation being performed on the HMI 7 by the driver.

The surrounding situation, the host vehicle position, and the vehicle state are acquired first by the information acquisition unit 12 (Step S1). The scene determination process is executed by the scene determination unit 14 (Step S2). Specifically, it is determined, from the acquisition result of the information acquisition unit 12, whether or not the current traveling scene of the host vehicle V is the traveling-restricted scene, and then the restriction is calculated in a case where it is determined that the current traveling scene of the host vehicle V is the traveling-restricted scene.

The priority setting process is executed by the order setting unit 16 (Step S3). Specifically, the priorities corresponding to the restriction are set with respect to the plurality of driving behaviors from the acquisition result of the information acquisition unit 12 in the case where it is determined by the scene determination unit 14 that the traveling scene is the traveling-restricted scene. In the case where it is not determined by the scene determination unit 14 that the traveling scene is the traveling-restricted scene, the priorities determined in advance are set with respect to the plurality of driving behaviors from the acquisition result of the information acquisition unit 12.

The traveling plan generating unit 18 generates the plurality of traveling plans respectively corresponding to the driving behaviors, the priorities of which are set by the order setting unit 16, from the acquisition result of the information acquisition unit 12 (Step S4). The executability determination unit 20a determines, from the acquisition result of the information acquisition unit 12, executability with regard to each of the driving behaviors of the plurality of traveling plans generated by the traveling plan generating unit 18 (Step S5). The traveling plan selection unit 20b determines whether the number of traveling plans with an executable driving behavior is one or more (Step S6).

In the case of Yes in Step S6, the traveling plan selection unit 20b selects, from the plurality of traveling plans generated by the traveling plan generating unit 18, the single traveling plan that has the highest priority set by the order setting unit 16 among the driving behaviors determined by the executability determination unit 20a to be executable (Step S7). The traveling control unit 22 controls the traveling of the host vehicle V such that the automatic traveling is performed in accordance with the selected traveling plan (Step S8). Then, the process returns to Step S1 described above and the traveling control of the next cycle is repeatedly executed.

In the case of No in Step S6, the traveling control is terminated. At the time of this termination, the driver's override request is output from the HMI 7, the host vehicle V is decelerated and stopped by the traveling control unit 22, or emergency avoidance or the like is performed by the traveling of the host vehicle V being controlled by the traveling control unit 22. The traveling control is terminated in a normal manner in a case where the host vehicle V has arrived at the destination as a result of the traveling control described above or in a case where the driver's control-stopping input operation is performed on the HMI 7 during the traveling control.

Hereinafter, a case where the traveling-restricted scene is the lane-reduced scene will be described as a specific example of the process that is executed by the vehicle control device 100.

Figure 3:
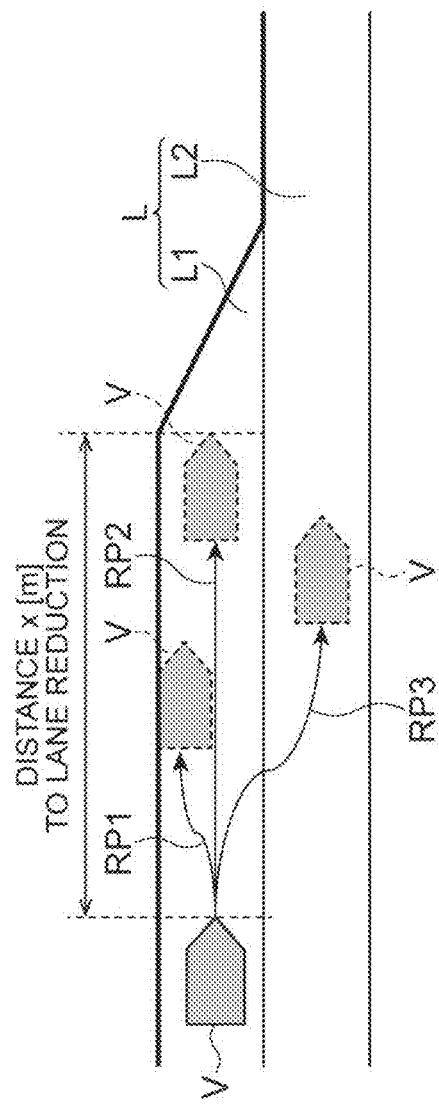
FIG. 3 is a schematic diagram illustrating the vicinity of a host vehicle in a lane-reduced scene.
Figure 4:
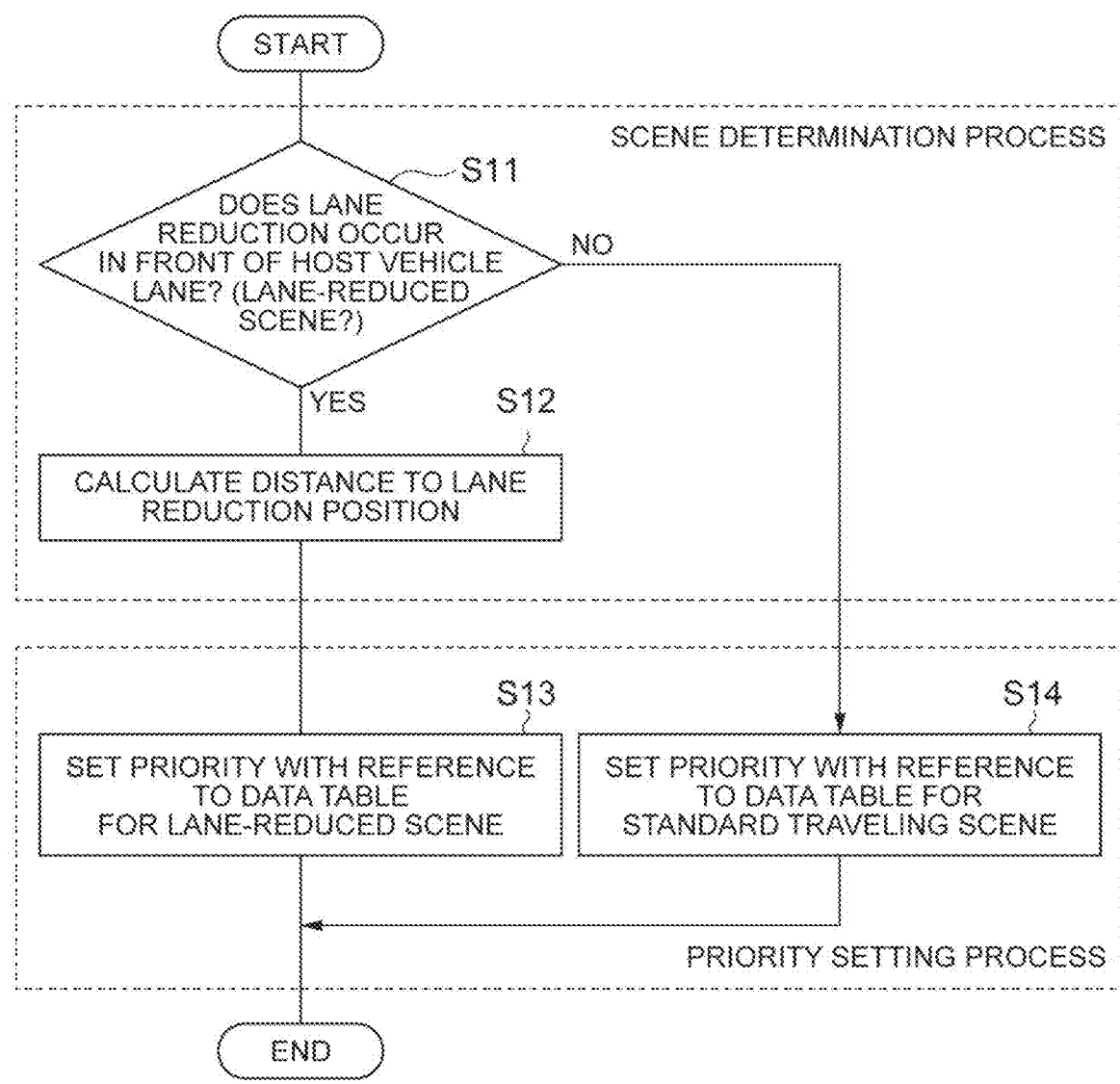
FIG. 4 is a flowchart illustrating a scene determination process and a priority setting process targeting the lane-reduced scene.

FIG. 3 is a schematic diagram illustrating the vicinity of the host vehicle in the lane-reduced scene. FIG. 4 is a flowchart illustrating the scene determination process and the priority setting process targeting the lane-reduced scene. In the lane-reduced scene that is illustrated in FIG. 3, a host vehicle lane L1 disappears in the front of a traveling path L including the host vehicle lane L1, which is the current position of the host vehicle V, and a right adjacent lane L2, and only the right adjacent lane L2 remains as it is. In this example, "lane keeping", "lane change (right side)", "evacuation", and "emergency stop" are pre-classified and set as the driving behaviors (refer to FIGS. 5A and 5B). In FIG. 3, a traveling plan RP1 realizes the driving behavior of "evacuation", a traveling plan RP2 realizes the driving behavior of "lane keeping", and a traveling plan RP3 realizes the driving behavior of "lane change".

FIGS. 5A and 5B are diagrams illustrating examples of the data tables used in the priority setting process illustrated in FIG. 4. FIG. 5A is a diagram illustrating a data table T1 for a standard traveling scene, which is the traveling scene at a standard time. FIG. 5B is a diagram illustrating a data table T2 for the lane-reduced scene. In FIGS. 5A and 5B, First has the highest priority and the priority becomes higher as the rank becomes closer to First. "Unselectable" indicates "no room for selection" described above.

As illustrated in FIG. 5A, the data table T1 for the standard traveling scene defines a rule for priority setting at the standard time. According to this data table T1, the priority and the driving behavior have a fixed relationship regardless of the distance x to the lane reduction position. As illustrated in FIG. 5B, the data table T2 for the lane-reduced scene defines a rule for priority setting at the time of lane reduction. In this data table T2, the priority and the driving behavior have a correlation that varies with the state of the distance x to the lane reduction position. Specifically, the correlations differ from one another that pertain to a case where the distance x constituting the restriction of the lane-reduced scene is greater than a first distance threshold (500 m herein), a case where the distance x constituting the restriction of the lane-reduced scene is greater than a second distance threshold (200 m herein) and is equal to or less than the first distance threshold, a case where the distance x constituting the restriction of the lane-reduced scene is greater than a third distance threshold (50 m herein) and is equal to or less than the second distance threshold, and a case where the distance x constituting the restriction of the lane-reduced scene is greater than 0 m is equal to or less than the third distance threshold.

The ECU 10 executes the following process as the scene determination process and the priority setting process as illustrated in FIG. 4 in a case where the targeted traveling-restricted scene is the lane-reduced scene. The scene determination unit 14 determines, based on the acquisition result of the information acquisition unit 12, whether or not lane reduction occurs in the front of the host vehicle lane L1 (Step S11). In this manner, it is determined whether or not the current traveling scene is the lane-reduced scene. In the case of Yes in Step S11, it is determined that the traveling scene is the lane-reduced scene and the distance x [m] from the current location of the host vehicle V to the lane reduction position is calculated based on the acquisition result of the information acquisition unit 12 (Step S12).

After Step S12, the priorities corresponding to the distance x to the lane reduction position are set for the plurality of driving behaviors with reference to the data table T2 for the lane-reduced scene (Step S13). In the case of No in Step S11, it is determined that the traveling scene is not the lane-reduced scene and standard priorities are set for the plurality of driving behaviors with reference to the data table T1 for the standard traveling scene (Step S14).

Assuming that the host vehicle V is traveling in the traveling path L where, for example, the lane reduction occurs at a position 300 m ahead in the host vehicle lane L1, a Yes determination is made in Step S11 and 300 m is calculated as the distance x to the lane reduction position in Step S12. In Step S13, the data table T2 for the lane-reduced scene is referred to and "lane change" is set as the First-priority driving behavior, "lane keeping" is set as the Second-priority driving behavior, "evacuation" is set as the Third-priority driving behavior, and "no room for selection" is set for the emergency stop since the distance x to the lane reduction position is 300 m. In Step S5 in FIG. 2, the executability determination unit 20a determines that "lane change" is inexecutable and determines that "lane keeping", "evacuation", and "emergency stop" are executable because of the parallel-traveling surrounding car. As a result, a Yes determination is made in Step S6. In Step S7, the Second-priority "lane keeping", which has the highest priority among the executable "lane keeping", "evacuation", and "emergency stop", is selected. Then, in Step S8, the traveling control is executed based on the traveling plan of "lane keeping".

Hereinafter, a case where the traveling-restricted scene is the slow car-present scene will be described as another specific example of the process that is executed by the vehicle control device 100.

Figure 7:
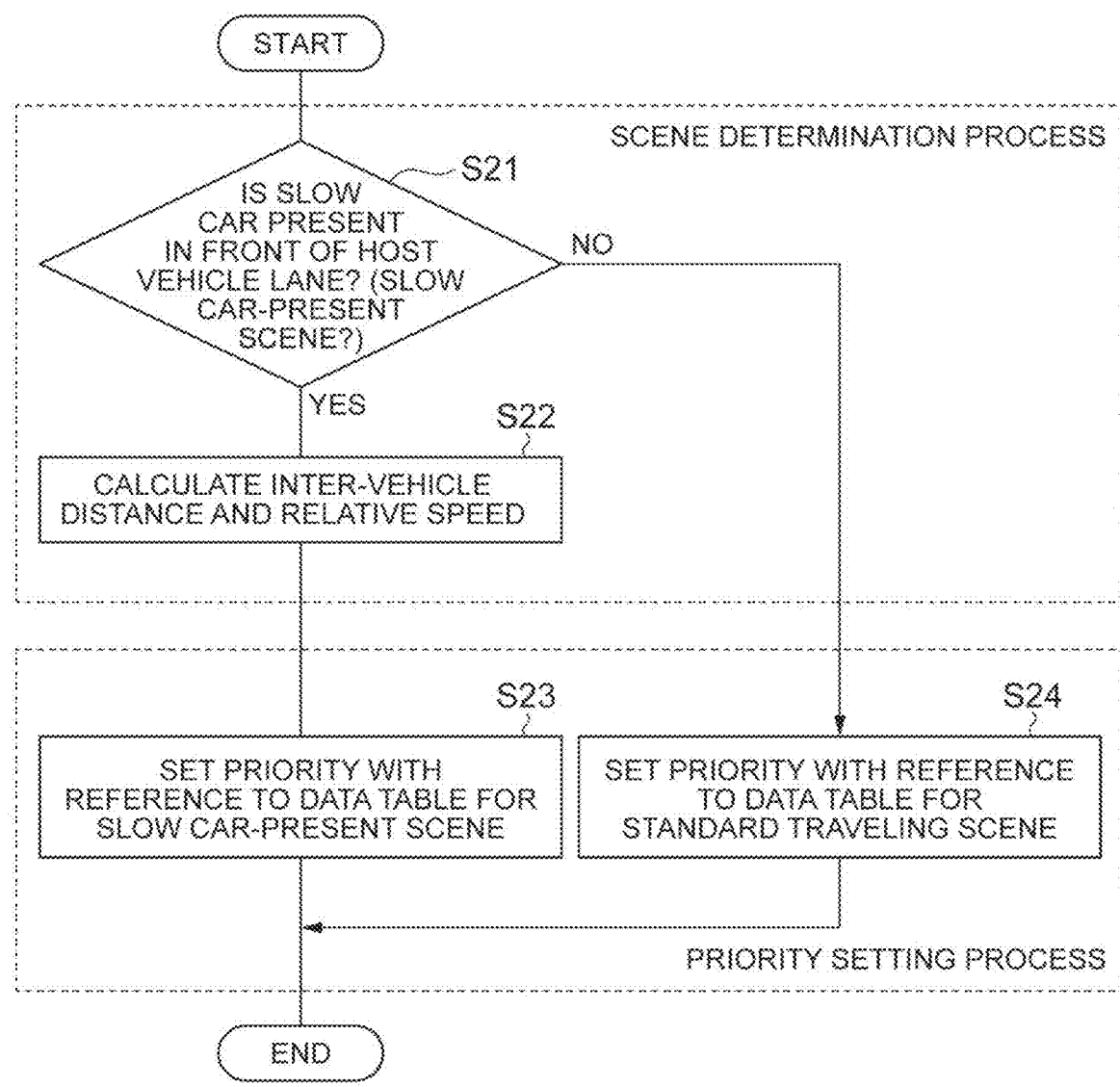
FIG. 7 is a flowchart illustrating the scene determination process and the priority setting process targeting the slow car-present scene.

FIG. 6 is a schematic diagram illustrating the vicinity of the host vehicle in the slow car-present scene. FIG. 7 is a flowchart illustrating the scene determination process and the priority setting process targeting the slow car-present scene. In the slow car-present scene that is illustrated in FIG. 6, a slow car V2, which is a preceding car with a low vehicle speed, is present in front of the host vehicle V in the host vehicle lane L1 in the traveling path L including the host vehicle lane L1 and the right adjacent lane L2. In this example, "lane keeping", "lane change (right side)", "evacuation", and "emergency stop" are pre-classified and set as the driving behaviors (refer to FIGS. 8A and 8B). In FIG. 6, a traveling plan RP4 realizes the driving behavior of "lane change" and a traveling plan RP5 realizes the driving behavior of "lane keeping".

FIGS. 8A and 8B are diagrams illustrating examples of the data tables used in the priority setting process illustrated in FIG. 7. FIG. 8A is a diagram illustrating a data table T3 for the standard traveling scene. FIG. 8B is a diagram illustrating a data table T4 for the slow car-present scene. In FIGS. 8A and 8B, First has the highest priority and the priority becomes higher as the rank becomes closer to First. "Unselectable" indicates "no room for selection" described above.

As illustrated in FIG. 8A, the data table T3 for the standard traveling scene defines a rule for priority setting at the standard time. According to this data table T3, the priority and the driving behavior have a fixed relationship. As illustrated in FIG. 8B, the data table T4 for the slow car-present scene defines a rule for priority setting at the time of slow car presence. In this data table T4, the priority and the driving behavior have a correlation that varies with the states of the inter-vehicle distance x_fwd and the relative speed vrel with respect to the slow car V2. Specifically, the correlations differ from each other that pertain to a case where an inter-vehicle time obtained by the inter-vehicle distance x_fwd being divided by the relative speed vrel is greater than 0 s and is equal to or less than a time threshold (20 s herein) and the other case. The inter-vehicle distance x_fwd and the relative speed vrel constitute the restriction of the slow car-present scene.

The ECU 10 executes the following process as the scene determination process and the priority setting process as illustrated in FIG. 7 in a case where the targeted traveling-restricted scene is the slow car-present scene. The scene determination unit 14 determines, based on the acquisition result of the information acquisition unit 12, whether or not the slow car V2 is present in the front of the lane of the host vehicle (Step S21). In this manner, it is determined whether or not the current traveling scene is the slow car-present scene. The slow car V2 is a preceding car that has a speed lower by at least a vehicle speed threshold than the target vehicle speed of the host vehicle V. In the case of Yes in Step S21, it is determined that the traveling scene is the slow car-present scene and the inter-vehicle distance x_fwd and the relative speed vrel with respect to the slow car V2 are calculated based on the acquisition result of the information acquisition unit 12 (Step S22).

After Step S22, the priorities corresponding to the inter-vehicle time (inter-vehicle distance x_fwd and relative speed vrel) are set for the plurality of driving behaviors with reference to the data table T4 regarding the slow car presence (Step S23). In the case of No in Step S21, it is determined that the traveling scene is not the slow car-present scene and the standard priorities are set for the plurality of driving behaviors with reference to the data table T3 for the standard traveling scene (Step S24).

Hereinafter, a case where the determination objects are a plurality of the traveling-restricted scenes (slow car-present scene and branching scene herein) will be described as another specific example of the process that is executed by the vehicle control device 100.

Figure 9:
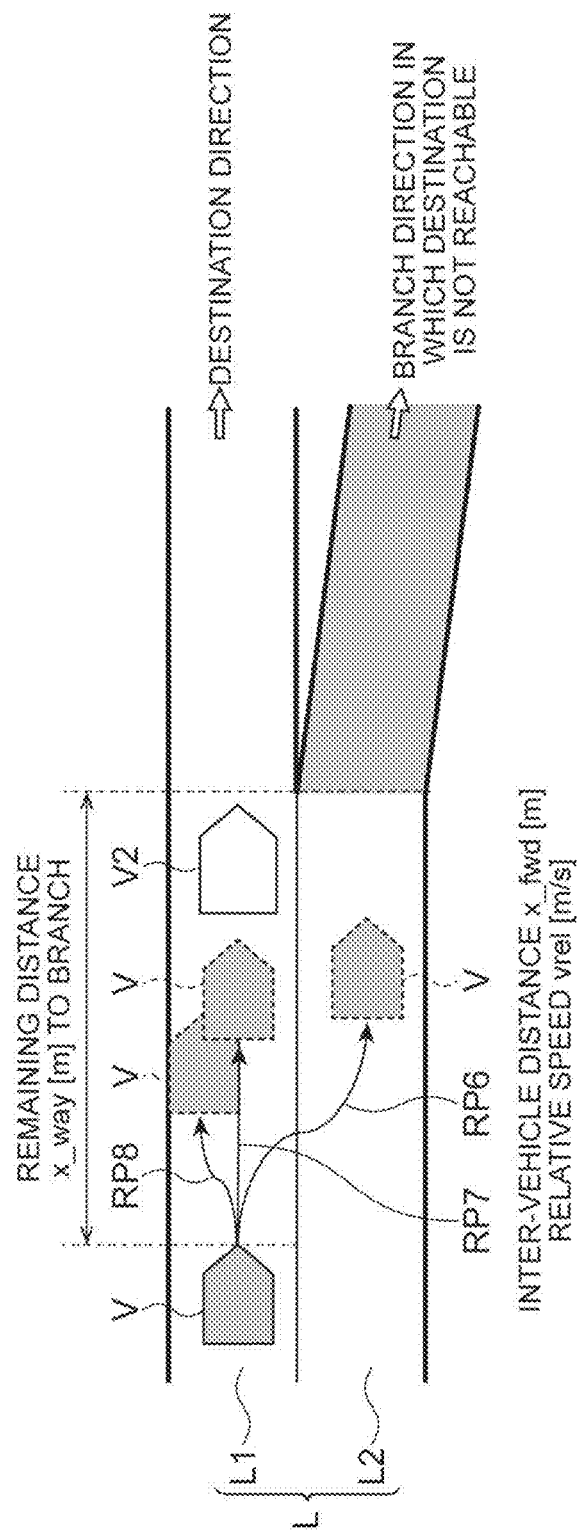
FIG. 9 is a schematic diagram illustrating the vicinity of the host vehicle in a traveling-restricted scene including the slow car-present scene and a branching scene.

FIG. 9 is a schematic diagram illustrating the vicinity of the host vehicle in a traveling-restricted scene including the slow car-present scene and the branching scene. FIG. 10 is a flowchart illustrating the scene determination process and the priority setting process targeting the slow car-present scene and the branching scene.

The traveling-restricted scene that is illustrated in FIG. 9 is a traveling-restricted scene including the slow car-present scene and the branching scene (hereinafter, referred to as a "slow car-present branching scene"). In the slow car-present branching scene, the slow car V2, which is a preceding car with a low vehicle speed, is present in front of the host vehicle V in the host vehicle lane L1 in the traveling path L including the host vehicle lane L1 and the right adjacent lane L2. The branch is present in front of the host vehicle V, and the host vehicle lane L1 is in a destination direction in which the destination is reachable whereas the right adjacent lane L2 is in a branch direction in which the destination is not reachable. In this example, "lane keeping", "lane change (right side)", and "evacuation" are pre-classified and set as the driving behaviors. In FIG. 9, a traveling plan RP6 realizes the driving behavior of "lane change", a traveling plan RP7 realizes the driving behavior of "lane keeping", and a traveling plan RP8 realizes the driving behavior of "evacuation".

FIGS. 11A and 11B are diagrams illustrating examples of the data tables used in the priority setting process illustrated in FIG. 10. FIG. 11A is a diagram illustrating a data table T5 for the standard traveling scene. FIG. 11B is a diagram illustrating a data table T6 for the slow car-present scene. In FIGS. 11A and 11B, First has the highest priority and the priority becomes higher as the rank becomes closer to First. "Unselectable" indicates "no room for selection" described above.

As illustrated in FIG. 11A, the data table T5 for the standard traveling scene defines a rule for priority setting at the standard time. According to this data table T5, the priority and the driving behavior have a fixed relationship. As illustrated in FIG. 11B, the data table T6 for the slow car-present branching scene defines a rule for priority setting at the time of slow car presence and at the time of traveling right ahead of the branch. In this data table T6, the priority and the driving behavior have a correlation that varies with the states of the inter-vehicle distance x_fwd and the relative speed vrel with respect to the slow car V2 and the state of the remaining distance x_way to the branch. Specifically, the correlations differ from each other that pertain to a case where the inter-vehicle time is greater than 0 s and is equal to or less than the time threshold (20 s herein) and the other case. In addition, the correlations differ from each other that pertain to a case where the remaining distance x_way is greater than 0 m and is equal to or less than a distance threshold (600 m herein) and the other case. The inter-vehicle distance x_fwd and the relative speed vrel constitute the restriction of the slow car-present scene. The remaining distance x_way constitutes the restriction of the branching scene. A correction in the form of margin distance addition may be performed on the remaining distance x_way.

The ECU 10 executes the following process as the scene determination process and the priority setting process as illustrated in FIG. 10 in a case where the targeted traveling-restricted scene includes the slow car-present scene and the branching scene. The scene determination unit 14 determines, based on the acquisition result of the information acquisition unit 12, whether or not the slow car V2 is present in the front of the lane of the host vehicle (Step S31). In this manner, it is determined whether or not the current traveling scene is the slow car-present scene. In the case of Yes in Step S31, it is determined that the traveling scene is the slow car-present scene and the inter-vehicle distance x_fwd and the relative speed vrel are calculated based on the acquisition result of the information acquisition unit 12 (Step S32).

The scene determination unit 14 determines, based on the acquisition result of the information acquisition unit 12, whether or not the branch is present in the front of the host vehicle lane L1 and the host vehicle lane L1 is in the destination direction (Step S33). In this manner, it is determined whether or not the current traveling scene is the branching scene. In the case of Yes in Step S33, it is determined that the traveling scene is the branching scene and the remaining distance x_way to the branch position is calculated based on the acquisition result of the information acquisition unit 12 (Step S34).

After Step S34, the priorities corresponding to the inter-vehicle distance x_fwd, the relative speed vrel, and the remaining distance x_way are set for the plurality of driving behaviors with reference to the data table T6 for the slow car-present branching scene (Step S35). In the case of No in Step S31, it is determined that the traveling scene is not the slow car-present branching scene and the standard priorities are set for the plurality of driving behaviors with reference to the data table T5 for the standard traveling scene (Step S36).

According to this embodiment described above, the priorities are set for the plurality of driving behaviors in view of the traveling-restricted scene determination result. The plurality of traveling plans respectively corresponding to the plurality of driving behaviors are generated. The executability of each of the plurality of driving behaviors is determined. The traveling plan corresponding to the driving behavior with the highest priority among the executable driving behaviors is selected from the plurality of traveling plans. Then, the traveling of the host vehicle V is controlled based on the selected traveling plan. In this manner, the necessity for generating new traveling plan that is attributable to the inexecutability of the driving behavior in the generated traveling plan can be reduced. Accordingly, the possibility of a delayed reaction of the traveling control for the host vehicle V can be suppressed.

The traveling-restricted scene as the object of this embodiment is not limited to what has been described above. The traveling-restricted scene as the object of this embodiment may correspond to various traveling-restricted scenes. Each of the thresholds described above may be a fixed value determined in advance or may be a variable value depending on, for example, an estimated value required for the driving behavior of the host vehicle V (such as an estimated distance required for the lane change).

In the description above, Step S2 constitutes a scene determination step. Step S3 constitutes an order setting step. Step S4 constitutes a traveling plan generation step. Step S5 constitutes an executability determination step. Steps S6 and S7 constitute a traveling plan selection step. Step S8 constitutes a traveling control step.

In the vehicle control device 100 according to this embodiment, the priority result of the previous process cycle may be reflected in the priority setting during the current process cycle by the order setting unit 16. In other words, the previous driving behavior priority may be fed back to the current driving behavior priority. At a time when the traveling control unit 22 has actually controlled the traveling based on the traveling plan of lane change in a case where the priority of the driving behavior of "lane change" was set as the highest priority in the previous process cycle, for example, the order setting unit 16 may set the highest priority for the driving behavior of "lane change" in the current process cycle as well. In this manner, selection of the driving behavior of lane keeping during the lane change becomes less likely to occur.

In the vehicle control device 100 according to this embodiment, a parameter included in the generated traveling plan or a variable symbolizing a parameter group (hereinafter, simply referred to as a "parameter") may vary with the surrounding situation. The parameter is a value related to the vehicle motion of the host vehicle V or a value related to a relationship with the surrounding car or the obstacle. Accordingly, situation-dependent different types of traveling can be performed even during the traveling control based on the traveling plan of the same driving behavior.

As an example of the parameter change, the traveling plan generating unit 18 may cause a steering parameter at a time when a remaining distance until the lane change is long to differ from the steering parameter at a time when the remaining distance until the lane change is short in the case of generation of the traveling plan of lane change in which the lane change is required to be completed within a limited distance. A detection method based on threshold-based size determination can be adopted as a specific method for detecting the length of the remaining distance.

The traveling plan generating unit 18 may also change the steering parameter as a function of the remaining distance until the lane change. Specifically, a steering angle may have a maximum value that increases as the remaining distance until the lane change decreases. Because the steering angle and the lateral acceleration have a proportional relationship, a large steering angle at a time when the remaining distance is short allows the host vehicle V to reach the pre-lane change lane within a short distance. The lane change can be performed without the traveling control being stopped, and thus the necessity of the driver's intervention operation (inconvenience) can be reduced. The steering angle may decrease as the remaining distance until the lane change increases, too. In this manner, an improvement in riding comfort can be achieved with the lateral acceleration reduced. In addition, the steering speed may increase as the remaining distance until the lane change decreases. Although an increase in steering angle leads to an increase in lateral acceleration, the host vehicle V can reach the pre-lane change lane within a short distance and with the lateral acceleration being suppressed insofar as the steering is controlled such that the same angle is reached within a short predetermined period of time with an increased steering speed. The riding comfort can be improved in this manner.

In this type of traveling-restricted scene where the remaining distance is the restriction (traveling-restricted scene where a demerit arises in the form of lane change incompletion such as the lane-reduced scene, the junction scene, and branching to a branch road leading to the destination), the driver might have to perform an intervention operation in some situations with the completion of the traveling control-based lane change being impossible. By the steering parameter being changed in accordance with the remaining distance in this regard, steering appropriate for situations can be performed during the traveling control and the riding comfort can be ensured even during a lane change within a limited distance.

As another example of the parameter change, the traveling plan generating unit 18 may change the vehicle speed of the host vehicle V such that the distance required for the lane change changes in accordance with the remaining distance until the lane change. Specifically, the vehicle speed of the host vehicle V may be reduced as the remaining distance until the lane change decreases. At this time, the vehicle speed of the host vehicle V may be changed such that the vehicle speed of the host vehicle V does not fall below a predetermined minimum speed value. The vehicle speed may be changed only in a case where the remaining distance until the lane change falls below a threshold, too.

As another example of the parameter change, the traveling plan generating unit 18 may change an arrival position target of the lane change in accordance with the remaining distance until the lane change. Specifically, the arrival position target of the lane change may be set to be closer to the current location as the remaining distance until the lane change decreases. Then, the host vehicle V can reach the pre-lane change lane after traveling a minimum traveling distance and the risk of being incapable of automatic lane change can be reduced. At this time, a lateral position of the arrival position target may be set on the basis of the white line or a lane centerline such that no lane deviation occurs at the time of lane change termination.

As another example of the parameter change, the traveling plan generating unit 18 may change the distance margin with respect to the obstacle around the host vehicle V such that the distance margin with respect to the obstacle around the host vehicle V at the time of a long remaining distance until the lane change differs from the distance margin with respect to the obstacle around the host vehicle V at the time of a short remaining distance until the lane change.

As another example of the parameter change, the traveling plan generating unit 18 may decrease the minimum inter-vehicle distance from the surrounding car as the remaining distance until the lane change decreases. At this time, the minimum inter-vehicle distance may be changed such that the minimum inter-vehicle distance does not fall below a distance threshold determined in advance. A method for the change or the minimum inter-vehicle distance may vary with the vehicle speed of the host vehicle V or the vehicle speed of the surrounding car. The method for the change or the minimum inter-vehicle distance may vary with recognition accuracy of various sensors or traveling control errors. A difference between a target lateral position of the traveling control and an actual lateral position can be used as the traveling control error. Then, the lane change can be performed without the traveling control being stopped and the necessity of the driver's intervention operation (inconvenience) can be reduced.

As another example of the parameter change, the traveling plan generating unit 18 in the case of generation of the traveling plan of lane keeping may change a distance margin with respect to a lane end in a vehicle width direction (vehicle width-direction distance of a space formed on the left side or the right side of the host vehicle V in the lane) such that the distance margin at the time of a significant traveling control error differs from the distance margin at the time of an insignificant traveling control error. In addition, the traveling plan generating unit 18 may change the distance margin with respect to the lane end in the vehicle width direction such that the distance margin increases as the traveling control error increases. By the distance margin being increased, the frequency of lane deviations can be reduced.

Second Embodiment

A second embodiment will be described below. In the following description of this embodiment, how the second embodiment differs from the first embodiment will be described.

Figure 12:
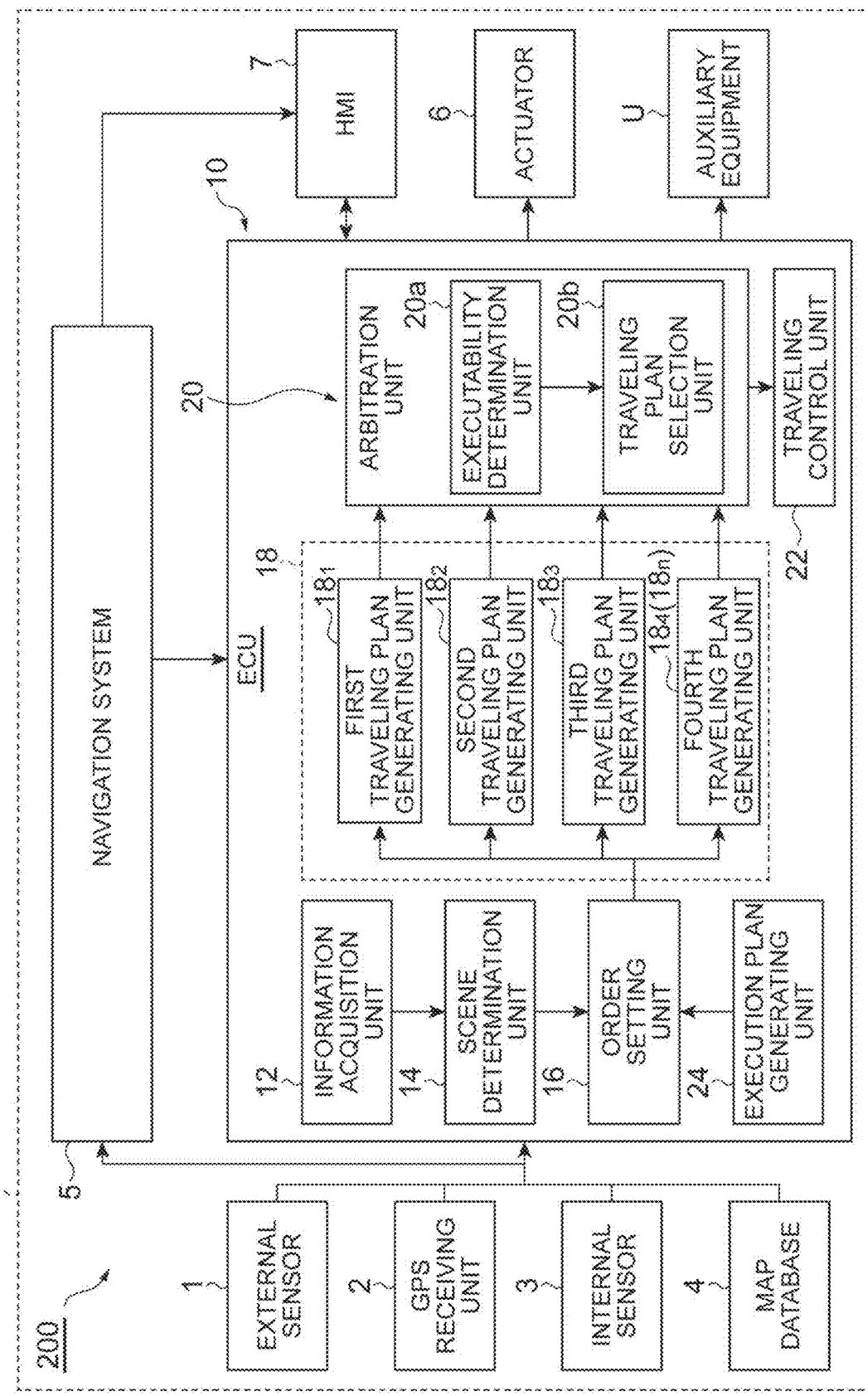
FIG. 12 is a block diagram illustrating a configuration of a vehicle control device according to a second embodiment.

FIG. 12 is a block diagram illustrating a configuration of a vehicle control device 200 according to the second embodiment. As illustrated in FIG. 12, the vehicle control device 200 according to this embodiment differs from the vehicle control device 100 (refer to FIG. 1) in that an execution plan generating unit 24 is provided in the vehicle control device 200.

The execution plan generating unit 24 generates a driving behavior execution plan (refer to FIG. 13C), which is a transition of the driving behavior during the traveling along the target route from the current location to the destination, based on the surrounding situation, the host vehicle position, and the map information. In other words, the execution plan generating unit 24 assembles the driving behavior execution plan by using the acquisition result of the information acquisition unit 12 and the target route output from the navigation system 5 (also referred to as a route plan). The driving behavior execution plan is a driving behavior that the host vehicle V is to take in a terrain through which the host vehicle V is to pass in the future. The driving behavior execution plan can be expressed as a list corresponding to the driving behavior at each time for each time series. The driving behavior execution plan can be expressed as a list corresponding to the driving behavior by distance for each traveling distance. The driving behavior execution plan can be expressed as a list corresponding to the driving behavior at each point for each place on the map.

Figure 13A:
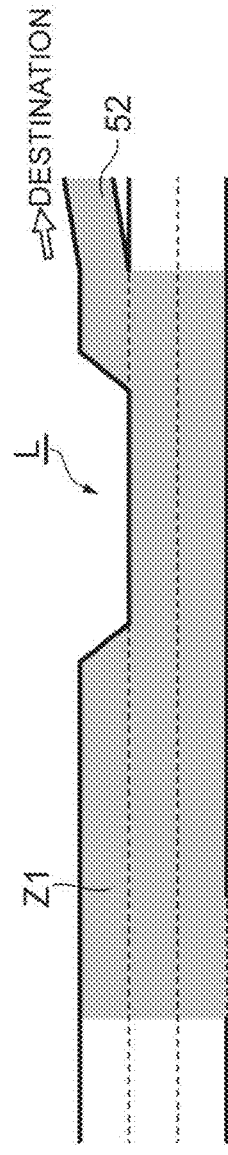
FIG. 13A is a diagram illustrating a positional region restricted by a target route.
Figure 13B:
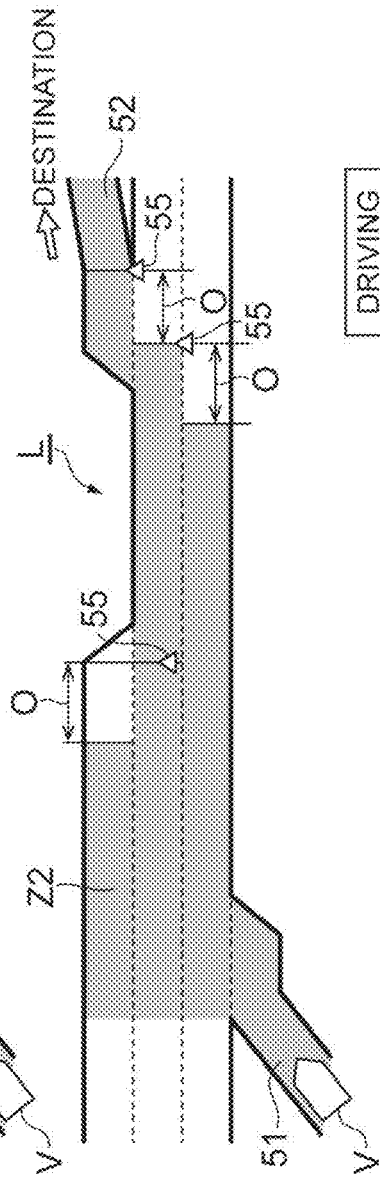
FIG. 13B is a diagram illustrating a positional region from which a destination is reachable.
Figure 13C:
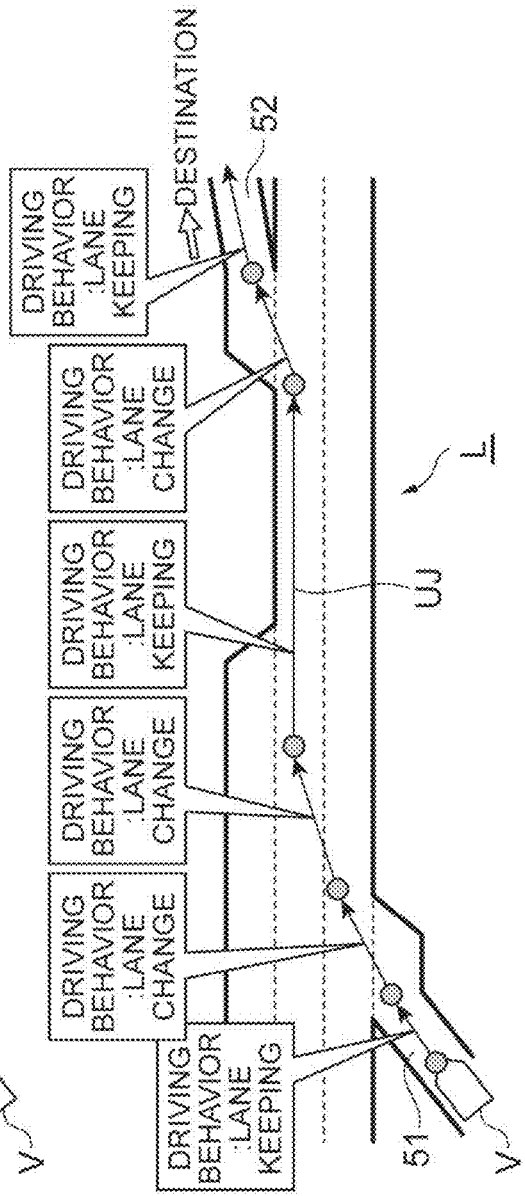
FIG. 13C is a diagram illustrating a driving behavior execution plan.

FIGS. 13A to 13C are diagrams showing the driving behavior execution plan generation. FIG. 13A is a diagram illustrating a positional region Z1 that is restricted by the target route. FIG. 13B is a diagram illustrating a positional region Z2 from which the destination is reachable. FIG. 13C is a diagram illustrating a driving behavior execution plan UJ.

As illustrated in FIG. 13A, the execution plan generating unit 24 derives the positional region Z1 based on the target route and on the basis of a joining position 51 and a branch position 52 on the traveling path L. As illustrated in FIG. 13B, the execution plan generating unit 24 derives the positional region Z2, from which the destination is reachable, by distinguishing a point 55 at which the lane change needs to be completed and using a conjectured value of a distance O required for the lane change. For example, the positional region Z2 is calculated by a temporary target position being determined and a position from which the target position is reachable being calculated back from the target position toward and in the direction of the current position. The positional region Z2 may also be derived on the restriction conditions of lane deviation-prevented traveling and law abidance of, for example, the white line being a yellow line. As illustrated in FIG. 13C, the execution plan generating unit 24 calculates the driving behavior execution plan UJ for reaching the destination after passing through the obtained positional region Z2.

The order setting unit 16 acquires the current driving behavior (driving behavior at the current time or the current position) from the generated driving behavior execution plan UJ. The order setting unit 16 gives the highest priority to the acquired driving behavior. Specifically, the order setting unit 16 changes First to the driving behavior obtained from the driving behavior execution plan UJ and lowers the order of the other driving behaviors when the driving behavior other than the driving behavior obtained from the driving behavior execution plan UJ is First with regard to the priority of the data table referred to for the priority setting. The order setting unit 16 maintains the order as it is when the driving behavior obtained from the driving behavior execution plan UJ is already First with regard to the priority of the data table referred to for the priority setting.

Figure 14:
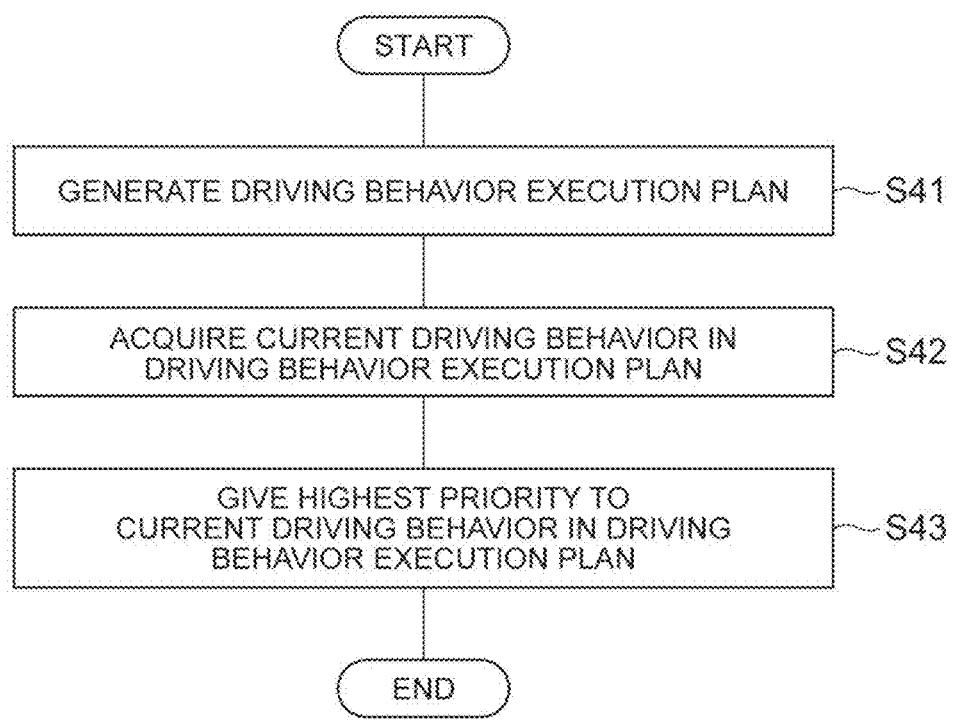
FIG. 14 is a flowchart illustrating a process in the vehicle control device in FIG. 12.

FIG. 14 is a flowchart illustrating a process in the vehicle control device 200 according to the second embodiment. As illustrated in FIG. 14, the ECU 10 of the vehicle control device 200 executes the following process. In other words, the execution plan generating unit 24 generates the driving behavior execution plan UJ based on the acquisition result of the information acquisition unit 12 and the target route output from the navigation system 5 (Step S41). The order setting unit 16 acquires the current driving behavior in the driving behavior execution plan UJ (Step S42). The order setting unit 16 gives the highest priority to the acquired driving behavior (Step S43).

According to this embodiment described above, the driving behavior execution plan UJ is generated and the priority of the current driving behavior in this driving behavior execution plan UJ becomes the highest priority. Accordingly, the likelihood of arrival at the destination can be improved.

The execution plan generating unit 24 may also generate the driving behavior execution plan UJ in accordance with traveling guidelines such as those for keeping left, reducing the number of lane changes for a reduction in lane change complexity, preferentially traveling in a high-speed limit lane, and overtaking the slow car so that the vehicle speed of the host vehicle V is not wasted.

The execution plan generating unit 24 may have any distance other than the distance to the destination as the distance of the generation of the driving behavior execution plan UJ. In this case, the execution plan generating unit 24 sets any point on the target route and generates the driving behavior execution plan that allows this point to be reached. The execution plan generating unit 24 may also generate the driving behavior execution plan UJ by subdividing and classifying the driving behavior of "lane change" into driving behaviors such as "joining", "branching", and "normal lane change on a main line".

An estimated value of the actual traveling distance of each driving behavior in the driving behavior execution plan UJ may be a value determined and set in advance, may be a calculated value obtained from the vehicle speed or a predicted vehicle speed of the host vehicle V, or may be a value depending on a congestion situation regarding the surrounding car. A margin may be added to the estimated value of the actual traveling distance of each driving behavior in the driving behavior execution plan UJ. In the case of approach to the point 55 at which the lane change needs to be completed, the traveling control unit 22 may perform a motion parameter change in the form of a reduction in the vehicle speed of the host vehicle V, a change in the steering parameter, or the like. In a case where a destination to be reached is not set with clarity, the traveling control unit 22 may control the traveling such that the traveling continues in the lane in which the traveling can be performed.

Figure 15:
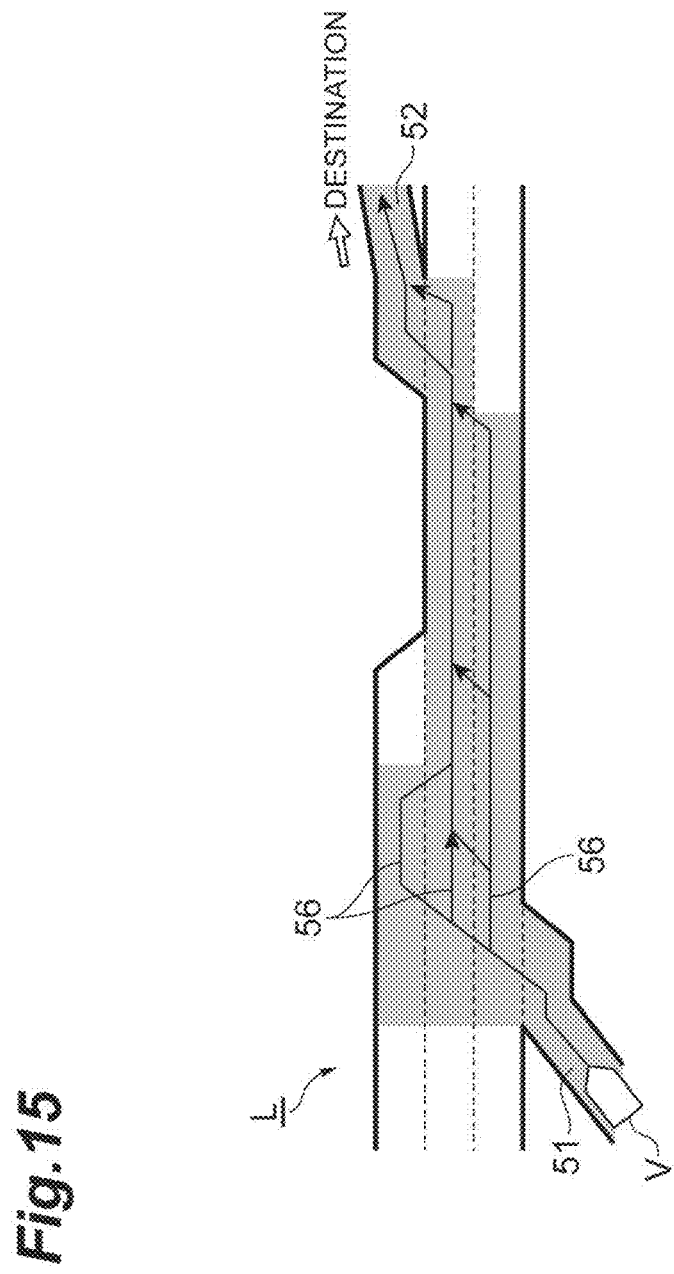
FIG. 15 is a diagram illustrating a plurality of execution plan candidates.

FIG. 15 is a diagram illustrating a plurality of execution plan candidates. As illustrated in FIG. 15, the execution plan generating unit 24 of the vehicle control device 200 according to this embodiment may calculate the plurality of execution plan candidates that allow the destination to be reached and select one of the plurality of execution plan candidates as the driving behavior execution plan UJ.

Specifically, the execution plan generating unit 24 generates a plurality of execution plan candidates 56 on the basis of a traveling guideline set in advance. Examples of the traveling guideline include overtaking a preceding slow car in accordance with the travel time, reducing the number of lane changes, keeping left, and avoiding a lane change higher in approach risk than a usual lane change such as interruption. Alternatively, the execution plan generating unit 24 may generate the plurality of execution plan candidates 56 at random. Alternatively, the execution plan generating unit 24 may generate the plurality of execution plan candidates 56 of all available patterns. Then, the execution plan generating unit 24 selects one of the plurality of execution plan candidates 56 as the driving behavior execution plan UJ based on a priority set in advance or a change in the surrounding situation. In the case of the generation of the driving behavior execution plan UJ as described above, the selection candidates can be reduced in some cases and the driving behavior execution plan UJ can be generated based on a simple selection criterion. A driving behavior including an operation that is not essential for reaching the destination, such as keeping left and overtaking, can be performed.

FIGS. 16A to 16E are diagrams showing another method for the generation of the driving behavior execution plan UJ. As illustrated in FIGS. 16A to 16E, the execution plan generating unit 24 may generate the driving behavior execution plan UJ as follows. Firstly, the driving behavior allowed to be selected for the arrival at the destination is associated with each point 9 in the positional region Z2 from which the destination is reachable.

Figure 16:
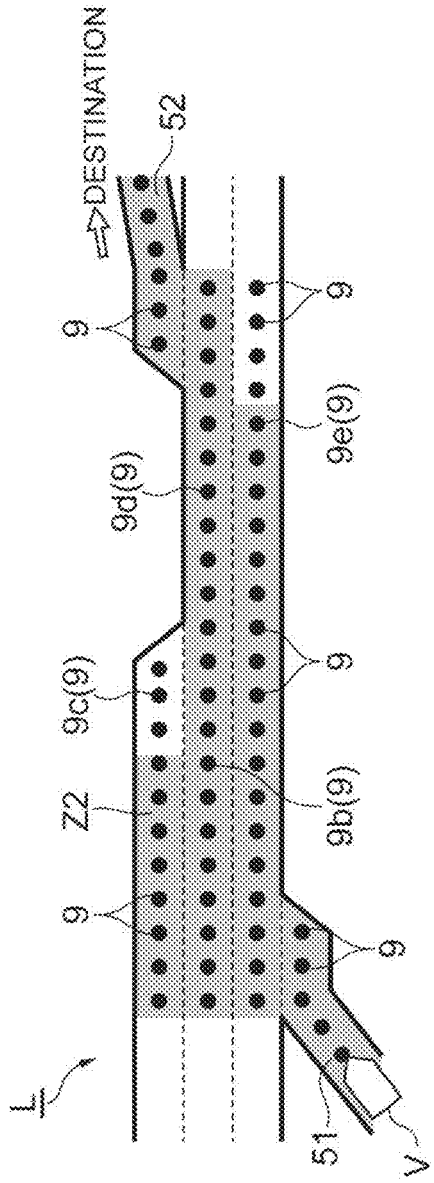
FIG. 16A is a diagram illustrating the positional region from which the destination is reachable and each point in the positional region.
FIG. 16B is a diagram illustrating examples of driving behaviors associated with the points in FIG. 16A.
FIG. 16C is a diagram illustrating examples of driving behaviors associated with the points in FIG. 16A.
FIG. 16D is a diagram illustrating examples of driving behaviors associated with the points in FIG. 16A.
FIG. 16E is a diagram illustrating examples of driving behaviors associated with the points in FIG. 16A.

For example, "lane keeping" and "lane change (right side)" are associated as the approved driving behaviors at a point 9b (refer to FIG. 16B). At a point 9c, "evacuation" is associated as the approved driving behavior (refer to FIG. 16C). At a point 9d, "lane keeping" and "evacuation" are associated as the approved driving behaviors (refer to FIG. 16D). At a point 9e, "lane change (left side)" and "evacuation" are associated as the approved driving behaviors (refer to FIG. 16E). In FIGS. 16B to 16E, "o" indicates approval and "x" indicates disapproval.

Then, the execution plan generating unit 24 obtains the plurality of execution plan candidates that satisfy the approved driving behavior. In other words, the execution plan generating unit 24 generates, if possible, the plurality of execution plan candidates using the current location as a starting point and reaching the destination by connection of each point 9 in a direction corresponding to the approved driving behavior. The execution plan generating unit 24 selects one of the plurality of generated execution plan candidates as the driving behavior execution plan UJ based on a priority set in advance or a change in the surrounding situation. In the case of the generation of the driving behavior execution plan UJ as described above, a detailed search for the driving behavior execution plan UJ can be performed.

In a case where a behavior request for a change in the vehicle behavior of the host vehicle V has been made by the driver (such as a case where an operation related to the lane change has been performed by the driver), the traveling may be controlled by the traveling control unit 22, such that the behavior is not carried out, when implementation of the behavior leads to a determination that the driving behavior execution plan UJ is absent (the host vehicle V moving out from the positional region Z2 from which the destination is reachable). At this time, the ECU 10 may notify the driver via the HMI 7 that "the requested behavior cannot be executed for arrival at the destination". Examples of the behavior requested by the driver include overtaking in the case of presence of a preceding slow car, lane change to a left lane in the case of traveling in a lane other than a keep-left lane, and lane change to a normal lane in the case of traveling in a climbing lane.

Third Embodiment

A third embodiment will be described below. In the following description of this embodiment, how the third embodiment differs from the first embodiment will be described.

The traveling plan generating unit 18 according to this embodiment changes the calculation resource used for the traveling plan generation based on the priority set by the order setting unit 16. Specifically, the traveling plan generating unit 18 reduces the calculation resource used for the traveling plan generation during the generation of the traveling plan corresponding to the low-priority driving behavior (hereinafter, also referred to as a "low-priority traveling plan"), which is the driving behavior for which a low priority is set by the order setting unit 16, in comparison to that during the generation of the traveling plan corresponding to the high-priority driving behavior (hereinafter, also referred to as a "high-priority traveling plan") as the driving behavior for which a high priority is set by the order setting unit 16. As a result, the traveling plan generating unit 18 achieves a state where a second calculation resource exceeds a first calculation resource, the first calculation resource being the calculation resource used for the generation of the low-priority traveling plan and the second calculation resource being the calculation resource used for the generation of the high-priority traveling plan.

The high-priority traveling plan includes a traveling plan other than the low-priority traveling plan. For example, in some cases, the high-priority traveling plan includes a traveling plan that realizes the high-priority driving behavior for which the highest priority or at least a certain level of priority is set by the order setting unit 16. The low-priority traveling plan includes a traveling plan other than the high-priority traveling plan. In some cases, the low-priority traveling plan includes a traveling plan that realizes the low-priority driving behavior for which the lowest priority or a priority lower than the certain level of priority is set by the order setting unit 16.

In a traveling scene where the traveling is performed in the traveling path L with a single lane, for example, the driving behavior of "lane change" corresponds to the low-priority driving behavior in some cases. In a traveling scene where the white line of the host vehicle lane L1 has the attribute of lane change prohibition, the driving behavior of "lane change in the direction of the white line" corresponds to the low-priority driving behavior in some cases. When the current driving behavior is the lane change (during the lane change), the driving behavior of "lane keeping" corresponds to the low-priority driving behavior in some cases. In a traveling scene where no surrounding car is present, the driving behavior of "avoidance" corresponds to the low-priority driving behavior in some cases. In a traveling scene where the obstacle is present around the host vehicle V, the driving behavior of "lane keeping" corresponds to the low-priority driving behavior and the driving behavior of "avoidance" corresponds to a predetermined driving behavior in some cases.

The calculation resource includes at least any one of the amount of calculation, spatial resolution or time resolution of data, calculation time, and memory usage. Calculation resource reduction includes reducing the amount of calculation, roughening the spatial resolution or the time resolution, increasing an error determination threshold of a convergence condition of optimization calculation, reducing the number of searches in hierarchical or time-series search, shortening the time allocated for the calculation, lengthening the time of output update interval, and decreasing the length of the traveling plan on a distance basis or on a time basis. In addition, the calculation resource reduction includes performing no calculation, that is, generating no traveling plan. In contrast, increasing the calculation resource includes increasing the amount of calculation, increasing the fineness of the spatial resolution or the time resolution, decreasing the error determination threshold of the convergence condition of the optimization calculation, increasing the number of searches in the hierarchical or time-series search, lengthening the time allocated for the calculation, shortening the time of output update interval, and increasing the length of the traveling plan on a distance basis or on a time basis. A change in the number of searches, for example, can be realized based on a change in the number of acceleration candidates or a step size of update time at each time.

Figure 17:
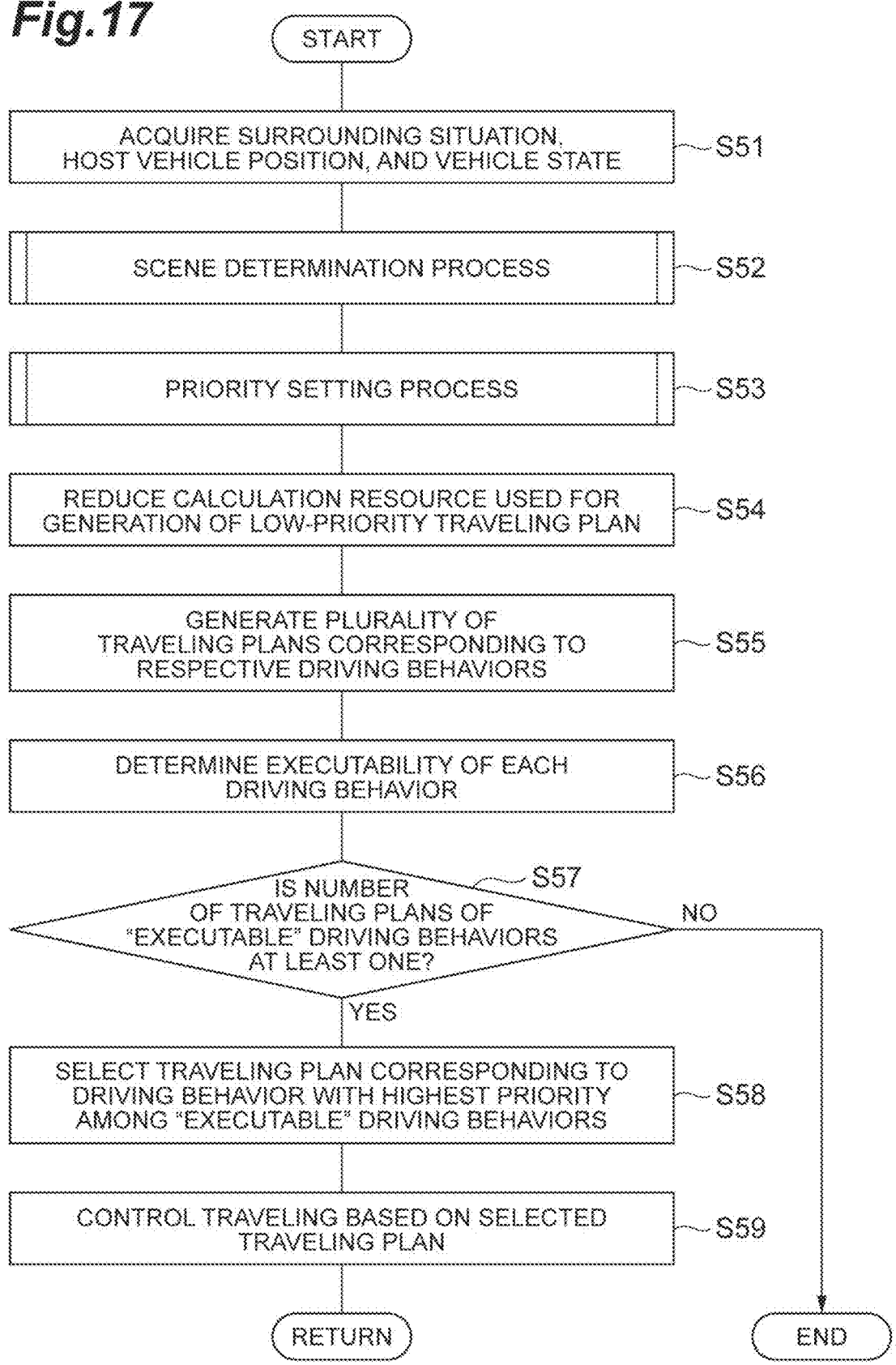
FIG. 17 is a flowchart illustrating a process in a vehicle control device according to a third embodiment.

FIG. 17 is a flowchart illustrating a process in the vehicle control device according to the third embodiment. As illustrated in FIG. 17, the ECU 10 of the vehicle control device 100 executes the following process.

The information acquisition unit 12 acquires the surrounding situation, the host vehicle position, and the vehicle state (Step S51). The scene determination unit 14 executes the scene determination process (Step S52). The order setting unit 16 executes the priority setting process (Step S53). The traveling plan generating unit 18 reduces the first calculation resource used for the generation of the low-priority traveling plan (S54). The traveling plan generating unit 18 generates, from the acquisition result of the information acquisition unit 12, the plurality of traveling plans corresponding to the respective driving behaviors (Step S55). In Step S55, the generation is performed under the calculation resource reduced in Step S54 with regard to the low-priority traveling plan among the plurality of traveling plans.

The executability determination unit 20a determines, from the acquisition result of the information acquisition unit 12, the executability of each of the driving behaviors of the plurality of traveling plans (Step S56). The traveling plan selection unit 20b determines whether or not the number of the traveling plans with an executable driving behavior is at least one (Step S57). In the case of Yes in Step S57, the traveling plan selection unit 20b selects, from the plurality of traveling plans, the single traveling plan corresponding to the highest-priority driving behavior among the executable driving behaviors (Step S58). The traveling of the host vehicle V is controlled by the traveling control unit 22 such that the automatic traveling of the host vehicle V is performed in accordance with the selected traveling plan (Step S59). Then the process returns to Step S51 and the traveling control of the next cycle is repeatedly executed. In the case of No in Step S57, the traveling control is terminated.

According to this embodiment, the first calculation resource used for the generation of the low-priority traveling plan of the low-priority driving behavior is reduced. In other words, a state is achieved where the calculation resource used for the traveling plan generation during the generation of the traveling plan corresponding to the driving behavior for which a low priority is set by the order setting unit 16 is reduced in comparison to that during the generation of the traveling plan corresponding to the driving behavior for which a high priority is set by the order setting unit 16. Accordingly, the amount of calculation that is required for the generation of the plurality of traveling plans can be reduced insofar as, for example, the second calculation resource used for the generation of the high-priority traveling plan is constant. The capability of a calculator that is required for the calculation can be reduced, which results in an advantage in terms of price. The high-priority traveling plan can be generated through calculation more detailed than the calculation of the low-priority traveling plan. The traveling control can be performed within a range not surpassing an upper limit of the amount of calculation.

The process in the traveling plan generating unit 18 according to this embodiment may be executed in a case where the number of simultaneously calculated traveling plans exceeds a defined number determined in advance. Although the first calculation resource used for the generation of the low-priority traveling plan is reduced in this embodiment, the second calculation resource used for the generation of the high-priority traveling plan may be increased instead thereof, in addition thereto, or in contrast thereto. The point is that the traveling plan generating unit 18 may achieve the state in the end where the second calculation resource exceeds the first calculation resource. It is a matter of course that this embodiment can be applied to the second embodiment described above.

The embodiments of the present invention have been described above. The present invention is not limited to the above-described embodiments and is implemented in various forms. Some of the functions of the ECU 10 according to the embodiments may be executed with the computer in the facility such as the information processing center capable of communicating with the host vehicle V.

What is claimed is:

1. A vehicle control device comprising:
   at least one processor configured to:
   determine whether or not a current traveling scene of a host vehicle is a traveling-restricted scene based on a situation surrounding the host vehicle, the traveling-restricted scene being a scene where traveling of the host vehicle has a restriction and at least one of a plurality of driving behaviors is affected by the restriction;
   based on the determination that the traveling scene is not the traveling-restricted scene, set a first priority order for each of the plurality of driving behaviors with respect to each other according to a data table predetermined in advance for a standard traveling scene;
   based on the determination that the traveling scene is the traveling-restricted scene, set a second priority order for each of the plurality of driving behaviors with respect to each other according to a data table predetermined in advance corresponding the restriction of the traveling-restricted scene;
   reduce a calculation resource used in a generation of a traveling plan that corresponds to a driving behavior, among the plurality of driving behaviors, that is low in priority as compared to the calculation resource used in the generation of the traveling plan that corresponds to a driving behavior, among the plurality of driving behaviors, that is high in priority;
   generate a plurality of traveling plans respectively corresponding to the plurality of driving behaviors based on the first priority order or the second priority order that has been set;
   determine executability of each of the plurality of driving behaviors based on the surrounding situation;
   select the traveling plan corresponding to the driving behavior with a highest priority among the driving behaviors determined to be executable from among the plurality of traveling plans that have been generated; and
   control the traveling of the host vehicle based on the traveling plan that has been selected.

2. The vehicle control device according to claim 1, wherein the at least one processor is further configured to generate a driving behavior execution plan, which is a transition of the driving behavior at a time of the traveling along a target route from a current location to a destination, based on the surrounding situation, a position of the host vehicle, and map information, wherein the highest priority is given to the current driving behavior in the driving behavior execution plan.

3. The vehicle control device of claim 1, wherein the plurality of driving behaviors include at least one of: evacuation and emergency stop.

4. The vehicle control device of claim 1, wherein the traveling plan is generated such that a length of travel time required for the vehicle to reach a destination is minimized.

5. The vehicle control device of claim 1, wherein the at least one processor is further configured to correct the driving behaviors in the road section by:
generating a plurality of alternative executable traveling plans in the road section having the detected at least one lane reduction, lane ending or lane obstacle, each of the plurality of alternative executable traveling plans corresponding to respective alternative driving behaviors in the road section that include at least one difference from each other in at least one part of the road section; and
selecting, from among the generated plurality of executable alternative traveling plans, an executable alternative traveling plan in the road section.

6. The vehicle control device of claim 5, wherein the selected executable alternative traveling plan gives priority to a certain type of driving behaviors in accordance with a distance to the detected at least one lane reduction, lane ending or lane obstacle.

7. The vehicle control device of claim 5, wherein the alternative executable traveling plans show transitions of vehicle speed of the vehicle, acceleration and deceleration of the vehicle, and steering torque of the vehicle.

8. The vehicle control device of claim 2, wherein the destination is based on input received from a person, the input including the destination and a request for autonomous driving.

9. An electronic device-implemented vehicle control method comprising:
determining whether or not a current traveling scene of a host vehicle is a traveling-restricted scene based on a situation surrounding the host vehicle, the traveling-restricted scene being a scene where traveling of the host vehicle has a restriction and at least one of a plurality of driving behaviors is affected by the restriction;
based on the determination that the traveling scene is not the traveling-restricted scene, setting a first priority order for each of the plurality of driving behaviors with respect to each other according to a data table predetermined in advance for a standard traveling scene;
based on the determination that the traveling scene is the traveling-restricted scene, setting a second priority order for each of the plurality of driving behaviors with respect to each other according to a data table predetermined in advance corresponding to the restriction of the traveling restricted scene;
reducing a calculation resource used in a generation of a traveling plan that corresponds to a driving behavior, among the plurality of driving behaviors, that is low in priority as compared to the calculation resource used in the generation of the traveling plan that corresponds to a driving behavior, among the plurality of driving behaviors, that is high in priority;
generating a plurality of traveling plans respectively corresponding to the plurality of driving behaviors based on the first priority order or the second priority order that has been set;
determining executability of each of the plurality of driving behaviors generated in the step of generating based on the surrounding situation;
selecting the traveling plan corresponding to the driving behavior with a highest priority that was set in the step of setting among the driving behaviors determined to be executable in the step of determining executability from the plurality of traveling plans that were generated in the step of generating; and
controlling the traveling of the host vehicle based on the traveling plan selected in the step of selecting.

10. The electronic device-implemented vehicle control method according to claim 9, further comprising generating a driving behavior execution plan, which is a transition of the driving behavior at a time of the traveling along a target route from a current location to a destination, based on the surrounding situation, a position of the host vehicle, and map information, wherein the highest priority is given to the current driving behavior in the driving behavior execution plan.

11. The electronic device-implemented vehicle control method according claim 10, wherein the destination is based on input received from a person, the input including the destination and a request for autonomous driving.

12. The electronic device-implemented vehicle control method according claim 9, wherein the plurality of driving behaviors include at least one of: evacuation and emergency stop.

13. The electronic device-implemented vehicle control method according claim 9, wherein the traveling plan is generated such that a length of travel time required for the vehicle to reach a destination is minimized.

14. The electronic device-implemented vehicle control method according claim 9, further comprising correcting the driving behaviors in the road section by:
generating a plurality of alternative executable traveling plans in the road section having the detected at least one lane reduction, lane ending or lane obstacle, each of the plurality of alternative executable traveling plans corresponding to respective alternative driving behaviors in the road section that include at least one difference from each other in at least one part of the road section; and
selecting, from among the generated plurality of executable alternative traveling plans, an executable alternative traveling plan in the road section.

15. The electronic device-implemented vehicle control method according claim 14, wherein the selected executable alternative traveling plan gives priority to a certain type of driving behaviors in accordance with a distance to the detected at least one lane reduction, lane ending or lane obstacle.

16. The electronic device-implemented vehicle control method according claim 14, wherein the alternative executable traveling plans show transitions of vehicle speed of the vehicle, acceleration and deceleration of the vehicle, and steering torque of the vehicle.

17. A non-transitory computer readable medium comprising computer-executable code, which, when executed by a processor, causes the processor to perform the vehicle control method of claim 9.

* * * * *